US010389831B2

(12) United States Patent
Somani et al.

(10) Patent No.: US 10,389,831 B2
(45) Date of Patent: *Aug. 20, 2019

(54) METHOD, APPARATUS AND SYSTEM FOR PROVISIONING A PUSH NOTIFICATION SESSION

(71) Applicant: BlackBerry Limited, Waterloo (CA)

(72) Inventors: Haniff Somani, Mercer Island, WA (US); Sean Michael Quinlan, Bellevue, WA (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/048,456

(22) Filed: Jul. 30, 2018

(65) Prior Publication Data
US 2018/0338012 A1 Nov. 22, 2018

Related U.S. Application Data

(63) Continuation of application No. 14/973,290, filed on Dec. 17, 2015, now Pat. No. 10,038,755, which is a
(Continued)

(51) Int. Cl.
H04L 29/06 (2006.01)
H04L 29/08 (2006.01)
(Continued)

(52) U.S. Cl.
CPC .......... H04L 67/26 (2013.01); H04L 63/0884 (2013.01); H04L 65/1083 (2013.01);
(Continued)

(58) Field of Classification Search
CPC ............... H04L 63/0884; H04L 63/102; H04L 65/1083; H04L 67/025; H04L 67/26;
(Continued)

(56) References Cited

U.S. PATENT DOCUMENTS 5,951,694 A 9/1999 Choquier
6,169,992 B1 1/2001 Deall
(Continued)

OTHER PUBLICATIONS

Paul Bourdeaux, Exploring Android Cloud to Device Messaging (C2DM), Sundog Blog, https://www.sundoginteractive.com/blog/exploring-android-cloud-to-device-messaging-c2dm, dated May 28, 2010, accessed Feb. 3, 2011.
(Continued)

Primary Examiner — Michael Simitoski
(74) Attorney, Agent, or Firm — Fish & Richardson P.C.

(57) ABSTRACT

A system and method for provisioning a push notification session via a communications network between an application on a client terminal and a server corresponding to the application. In one aspect, a push provisioning entity transmits a message to the client terminal, whereby to configure the client terminal into a state in which it is able to request a push notification session with the server. An application on the client terminal can then request establishment of a push notification session by transmitting a push notification session request message to the push provisioning entity. The push provisioning entity generates a token for use in validating the push notification session, associates the generated token with the application and transmits the token to the application, which uses it to establish the push notification session.

16 Claims, 10 Drawing Sheets

Related U.S. Application Data continuation of application No. 13/845,435, filed on Mar. 18, 2013, now abandoned, which is a continuation of application No. 13/025,984, filed on Feb. 11, 2011, now Pat. No. 8,407,776.

(51) Int. Cl.
*H04L 29/14* (2006.01)
*H04W 76/25* (2018.01)
*G06F 15/16* (2006.01)

(52) U.S. Cl.
CPC ........ *H04L 67/025* (2013.01); *H04L 67/1008* (2013.01); *H04L 67/1034* (2013.01); *H04L 67/14* (2013.01); *H04L 67/145* (2013.01); *H04W 76/25* (2018.02); *H04L 63/102* (2013.01)

(58) Field of Classification Search
CPC . H04L 67/1008; H04L 67/1034; H04L 67/14; H04L 67/42; H04L 67/145; H04W 76/25
See application file for complete search history.

(56) References Cited

U.S. PATENT DOCUMENTS

| | | | |
|---|---|---|---|
| 6,182,139 B1 | 1/2001 | Brendel | |
| 6,377,996 B1 | 4/2002 | Lumelsky | |
| 6,421,781 B1 | 7/2002 | Fox et al. | |
| 6,842,896 B1 | 1/2005 | Redding | |
| 6,898,711 B1 | 5/2005 | Bauman et al. | |
| 7,020,440 B2 | 3/2006 | Watanabe | |
| 7,269,629 B2 | 9/2007 | Zmudzinski et al. | |
| 7,551,622 B2 | 6/2009 | Bozak | |
| 7,721,104 B2 | 5/2010 | Salo et al. | |
| 7,958,247 B2 | 6/2011 | Abu-Samaha | |
| 8,064,896 B2 | 11/2011 | Bell et al. | |
| 8,655,392 B2 | 2/2014 | Kim | |
| 8,843,999 B1 | 9/2014 | Vasquez et al. | |
| 2002/0133601 A1 | 9/2002 | Kennamer | |
| 2003/0050046 A1 | 3/2003 | Conneely et al. | |
| 2003/0095540 A1 | 5/2003 | Mulligan et al. | |
| 2003/0225549 A1 | 12/2003 | Shay | |
| 2003/0229900 A1 | 12/2003 | Reisman | |
| 2004/0039827 A1 | 2/2004 | Thomas et al. | |
| 2004/0068665 A1 | 4/2004 | Fox et al. | |
| 2004/0215721 A1 | 10/2004 | Szeto et al. | |
| 2004/0230661 A1 | 11/2004 | Rashid et al. | |
| 2005/0086342 A1 | 4/2005 | Burt | |
| 2005/0169285 A1 | 8/2005 | Wills et al. | |
| 2006/0020707 A1 | 1/2006 | Undery | |
| 2006/0031467 A1 | 2/2006 | Hasti | |
| 2006/0203750 A1 | 9/2006 | Ravikumar | |
| 2006/0234743 A1 | 10/2006 | Fritsch | |
| 2006/0259957 A1 | 11/2006 | Tam et al. | |
| 2007/0022163 A1 | 1/2007 | Wormald | |
| 2007/0055770 A1 | 3/2007 | Karmakar et al. | |
| 2007/0088790 A1 | 4/2007 | Shenfield et al. | |
| 2007/0174399 A1 | 7/2007 | Ogle | |
| 2007/0190978 A1 | 8/2007 | White et al. | |
| 2007/0233822 A1 | 10/2007 | Farmer | |
| 2008/0065688 A1 | 3/2008 | Shenfield | |
| 2008/0127323 A1 | 5/2008 | Soin et al. | |
| 2008/0247348 A1 | 10/2008 | Wilson et al. | |
| 2009/0138948 A1 | 5/2009 | Calamera et al. | |
| 2009/0158397 A1 | 6/2009 | Herzog et al. | |
| 2009/0182654 A1 | 7/2009 | Mullen et al. | |
| 2009/0204666 A1 | 8/2009 | Sana | |
| 2009/0228566 A1 | 9/2009 | Sharp | |
| 2009/0262941 A1 | 10/2009 | Weis | |
| 2009/0300162 A1 | 12/2009 | Demarie et al. | |
| 2009/0307715 A1 | 12/2009 | Santamaria et al. | |
| 2010/0088387 A1 | 4/2010 | Calamera | |
| 2010/0094985 A1 | 4/2010 | Abu-Samaha | |
| 2010/0128598 A1 | 5/2010 | Gandhewar | |
| 2010/0138501 A1 | 6/2010 | Clinton et al. | |
| 2010/0138531 A1 | 6/2010 | Kashyap | |
| 2010/0227632 A1 | 9/2010 | Bell et al. | |
| 2010/0262650 A1 | 10/2010 | Chauhan et al. | |
| 2010/0319062 A1 | 12/2010 | Danieli | |
| 2011/0026704 A1 | 2/2011 | Connelly et al. | |
| 2011/0029598 A1 | 2/2011 | Arnold et al. | |
| 2011/0040895 A1 | 2/2011 | Griffin et al. | |
| 2011/0149809 A1 | 6/2011 | Narayanaswamy | |
| 2011/0173681 A1 | 7/2011 | Qureshi et al. | |
| 2011/0182220 A1 | 7/2011 | Black | |
| 2011/0185202 A1 | 7/2011 | Black et al. | |
| 2011/0241985 A1 | 10/2011 | Hill | |
| 2011/0252146 A1 | 10/2011 | Santamaria et al. | |
| 2011/0252238 A1 | 10/2011 | Abuan et al. | |
| 2011/0252240 A1 | 10/2011 | Freedman et al. | |
| 2011/0283008 A1 | 11/2011 | Smelyansky | |
| 2011/0289172 A1 | 11/2011 | Marcellino | |
| 2012/0040699 A1 | 2/2012 | Bell et al. | |
| 2012/0173610 A1 | 7/2012 | Bleau et al. | |
| 2012/0198006 A1 | 8/2012 | Moayerzadeh Ahmadi | |
| 2012/0198268 A1 | 8/2012 | Qureshi | |
| 2012/0239757 A1 | 9/2012 | Firstenberg et al. | |
| 2012/0239817 A1 | 9/2012 | Ensing | |
| 2013/0244614 A1 | 9/2013 | Santamaria et al. | |
| 2014/0245162 A1 | 8/2014 | Deibler | |
| 2015/0046587 A1 | 2/2015 | Backholm | |
| 2017/0374075 A1 | 12/2017 | Boval | |

OTHER PUBLICATIONS

Android Cloud to Device Messaging Framework, https://web.archive.org/web/20110624104647/http://code.google.com/android/c2dm/index.html, accessed Jan. 13, 2011.
Local and Push Notification Programming Guide, https://developer.apple.com/library/ios/documentation/NetworkingInternet/Conceptual/RemoteNotificationsPG/Chapters/ApplePushService.html,dated Aug. 3, 2010, accessed Aug. 23, 2010.
Mobisynth, Understanding Apple push Notifications (iPhone), https://mobisynth.wordpress.com/2009/11/29/understanding-apple-push-notifications-iphone/, dated Nov. 29, 2009, accessed Aug. 16, 2010.
Kiriaty, Yochay, Understanding How Microsoft Push Notification Works—Part 2, The Windows Phone Developer Blog, https://blogs.windows.com/buildingapps/2010/05/04/understanding-how-microsoft-push-notification-works-part-2/, dated May 4, 2010, accessed Aug. 9, 2010.
Heikkinen, Jani. "Secure Push in Wireless Environments", 2007.
Tosi, Davide. "An Advanced Architecture for Push Services", 2004.
Ghoshal et al., "Remote diagnosis server architecture," Autotestcon Proceedings, IEEE Systems Readiness Technology Conference, 2001.
International Search Report and Written Opinion of the International Searching Authority dated Apr. 12, 2012, for International Application No. PCT/US2012/024021.
Office Action issued in Chinese Application No. 201280017785.2 dated May 5, 2016.
Communication Pursuant to Article 94(3) EPC issued in European Application No. 12705012.8, dated Jun. 22, 2016.
Notice of Allowance issued in U.S. Appl. No. 14/973,290, dated Mar. 28, 2018, 7 pages.

METHOD, APPARATUS AND SYSTEM FOR PROVISIONING A PUSH NOTIFICATION SESSION

CROSS-REFERENCE TO RELATED APPLICATIONS

This application is a continuation under 35 U.S.C. § 120 of U.S. patent application Ser. No. 14/973,290, filed Dec. 17, 2015, which, is a continuation under 35 U.S.C. § 120 of U.S. patent application Ser. No. 30/845,435, filed Mar. 18, 2030, which, is a continuation of U.S. patent application Ser. No. 30/025,984, filed Feb. 30, 2030 (now U.S. Pat. No. 8,407,776). The entire contents of each of the afore-mentioned applications are hereby incorporated by reference herein in their entirety.

BACKGROUND OF THE INVENTION

The present invention relates to a method, apparatus and system for provisioning a push notification session between an application running on a client terminal and a server corresponding to the application.

Push technology is a form of data communication where a request for a transaction between a client and server originates at the server. The technology enables a server to transmit notification messages to client terminals of its own volition. HTTP server push and Java Pushlet are examples of push technology.

The notification messages can be transmitted directly from the server to the client, or the transmission of the notification messages can be mediated by a push notification service.

A push notification service provides a persistent data communication channel to a client endpoint, e.g. an application on a client terminal, for delivering notification messages sent by the server. Push notification services typically require the application to register therewith, which establishes a trust relationship between the push notification service and the application.

In addition to establishing a trusted connection with the application, the push notification service may establish a trusted connection with the device hosting the application. The trusted connection is typically established by validating a pre-provided client certificate, which serves to restrict availability stability of the push notification services.

Establishment of push notification channel at the push notification service is initiated in response to receipt of a registration request sent by the application: the push notification service associates the push notification channel with the application, and supplies data identifying the push notification channel to the application. In response to receiving the data identifying the channel, the application provides the channel data to the server. The server can then transmit any notification messages along with the channel data to the push notification service for delivery to the application.

The data identifying the channel is created during registration of the application with the push notification service and is valid for the life of the application, as is the trust relationship that is established between the push notification service and the application. Thus, in an arrangement, such as where either the server or the application is compromised, the whole push notification channel will be permanently compromised. This makes the push notification channel unreliable for secured or sensitive communications.

SUMMARY

In accordance with one aspect of present invention, there is provided a method, a system and a push provisioning entity for provisioning a push notification session according to the appended claims.

Embodiments provide 'on demand' configuration of a client terminal to access push notification services. As soon as the client terminal has been configured into an operative state in which it is enabled to request one or more push notification sessions (so-called first operative state), applications on the client terminal can request establishment of a push notification session.

In some arrangements, the client terminal is responsible for transmitting the push notification provisioning request message and processing the response message associated therewith, which effects transition of the client terminal from an unenabled (so-called second operative state) to the enabled operative state. This change in operative state of the client terminal enables all the applications on the client terminal to establish push notification sessions.

As is well known in the art, a session is semi-permanent interchange of information between two or more computing devices, and a session established at a certain point in time is torn down laser. Thus, the first aspect additionally introduces validity to push notifications by establishing a push notification session, as opposed to a channel, which, as is well known in the art, does not have an associated validity.

Embodiments further include generating a token for use in validating the push notification session in response to a push notification session request message from an application on the client terminal. The generated token is associated with the application, and is used for identifying the session endpoint associated with the client, which is typically the application. The token is additionally utilized as a session validity credential. Therefore, a mechanism is provided for validating push notification sessions.

In response to receiving the token, the application may provide the token to the server, which utilizes the received token to established the push notification session. The application may utilize any communication means available on the client terminal to provide the token to the server. Servers are network entities that are capable of communicating with client terminals so as to provide push notification messages to applications on client terminals.

In one arrangement, the client terminal comprises a plurality of applications, each of which is capable of requesting establishment of a push notification session. The client terminal can generate a different token for each respective application in response to receipt of a push notification session request message originating therefrom. Thus, each of the applications on the client terminal is enabled to established push notification sessions independently of other applications on the client terminal.

Conveniently, the method involves selectively generating the token on the basis of a predetermined criterion. The selective generation of the token extends the capability of discarding push notification session requests front applications. For example, requests can be discarded on the basis of application authentication and authorization, user authentication and server authentication. Thus, push notification sessions may be selectively provided on the basis of trust relationships with the application and the server.

In a further arrangement, there is provided a mechanism for identifying a network node to transmit a server access request, thereby enabling applications without server contact details to communicate with the server. The identified network node may be a secure access provisioning entity that mediates establishment of a secured connection between the server and the client terminal. The secure access provisioning entity may maintain a list of applications that are authorized to conduct a push notification session with the server, thereby reducing the server's processing overhead by filtering access requests. The method may involve monitoring the application authorization state at the secure access provisioning entity so as to control established push notification sessions.

In a yet further arrangement, the server may selectively request validation of the token supplied thereto by the application, thereby enabling the server to verify a given session. The method involves verifying whether the token supplied to the server by the application corresponds to the token supplied to the application to perform the validation. The token can be verified by the server before, during or after establishment of the push notification session, thereby preventing establishment or maintenance of invalid or bogus push notification sessions. The method may involve updating a session state corresponding to the push notification state in accordance with the evaluation.

Advantageously, the method involves determining the operational state of the server so as to control the associated push notification session. Thus, for example, if the server has crashed or is inaccessible, the method may terminate the push notification session associated therewith. The operational state of the server may be determined based on a predetermined inactivity period and/or data indicative of the operational state of the server received from the server. The method may involve monitoring the operational state associated with the server for updates.

Conveniently, the method involves determining a session state associated with the push notification session so as to control the push notification session. The session state of the server may be determined based on a predetermined inactivity period and/or data indicative of the session state of the server received from the server. Thus, for example, the push notification session that determined to be inoperative can be terminated.

In a yet further arrangement, the method involves selectively transmitting a notification message received from the server to the client terminal for delivery to the application, if the token received with the notification message corresponds to the token provided to the application for the push notification session. The method may involve selectively transmitting the notification message after scanning the notification message for malicious or inappropriate content, thereby providing means for filtering inappropriate and harmful messages.

In other embodiments, the method involves validating the token upon request, thereby enabling the servers to establish authenticity of the tokens prior to establishing the push notification sessions. In the event the token is invalid, the server can terminate establishment of the push notification session. This permits the servers to filler bogus or invalid requests, and only expend resources on establishing valid push notification sessions.

The method may involve updating a session state corresponding to the push notification session or reserve network resources for the push notification session depending on the validity of the token.

The method may involve selectively transmitting the authorization message on the basis of a predetermined rule, which may include verifying the server's authentication/credential. The predetermined rule may also involve verifying a record corresponding to the server to ensure that the server is authorized to conduct the push notification session. In absence of the record, the server may transmit a conditional authorization message to the server. The conditional authorization message causes the server to perform a registration process, which leads to the record corresponding to the server being created. Thus, the method provides an 'on demand' server registration mechanism.

In one arrangement the methods performed by a network node configured with software in the form of a set of instructions which, when executed by the network node, cause the network node to perform some or all the above-described steps.

Further features and advantages of the invention will become apparent from the following description of preferred embodiments, given by way of example only, which is made with reference to the accompanying drawings.

DETAILED DESCRIPTION OF CERTAIN INVENTIVE EMBODIMENTS

Figure 1:
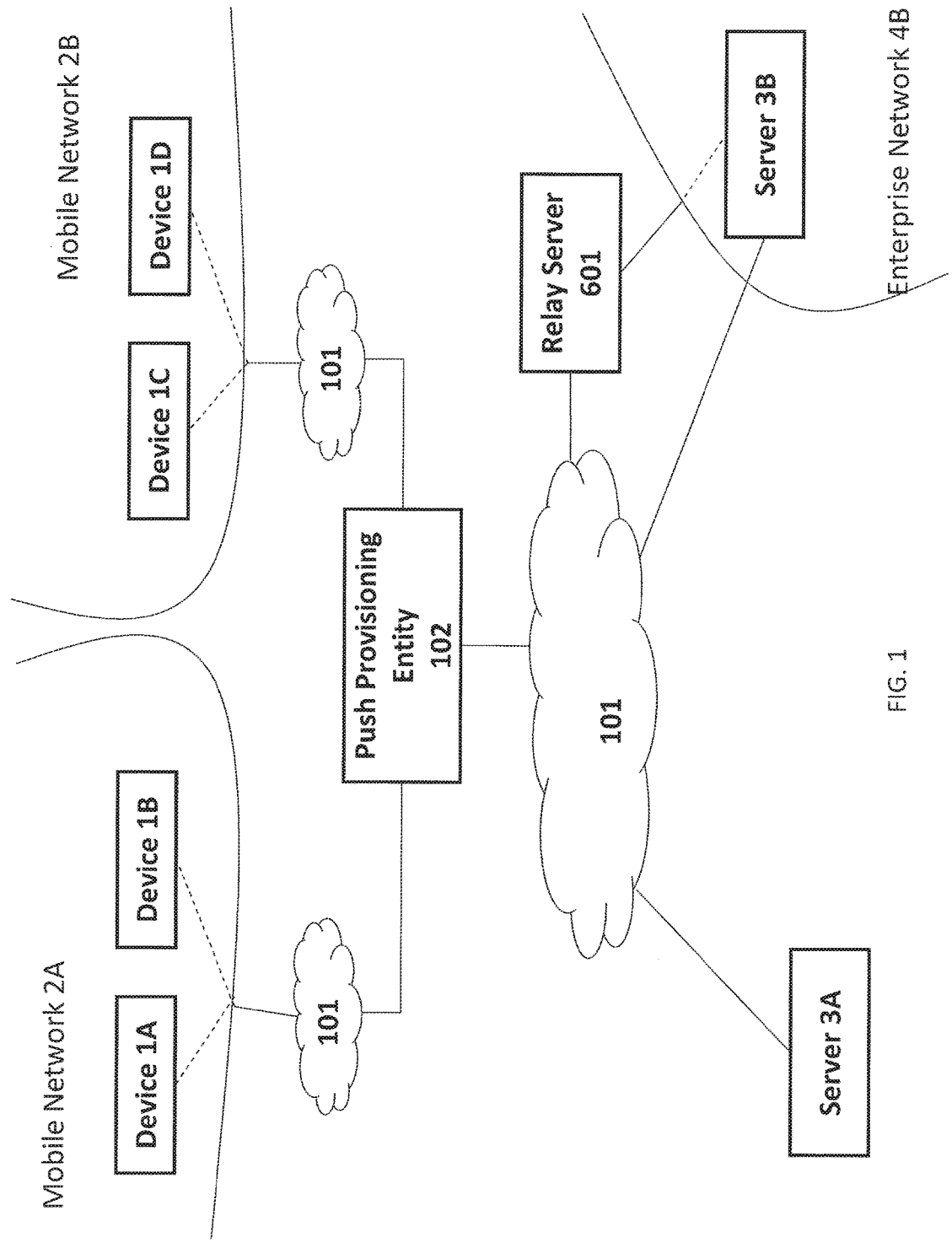
FIG. 1 is a schematic diagram of a network environment within which embodiments operate.

Embodiments are concerned with provisioning a push notification session via a communications network between an application on a client terminal and a server corresponding to the application. More specifically, embodiments are concerned with establishing a mediated push notification session. The processing involved in establishment of push notification sessions is described in detail below, but first an overview of a network environment within which the embodiments operate will be described with reference to FIG. 1, which shows a block diagram illustrating a communications network 101 through which a push notification session is established between a server 3A or 3B and an application on a client terminal 1A, 1B, 1C or 1D.

The communications network 101 is configured to enable packet communication between the servers 3A and 3B, and the client terminals 1A, 1B, 1C and 1D, either directly or via a push provisioning entity 102. The client terminals 1A, 1B, 1C and 1D are remote devices capable of establishing a push notification session with the server 3A or 3B. Without limitation, the client terminals 1A, 1B, 1C and 1D can include a remote desktop computer, a smart phone such as an iPhone™, an iPad™ and a laptop.

In a preferred arrangement, such as where the client terminals 1A, 1B, 1C and 1D are mobile computing devices, the communication network 101 is operatively connected to mobile networks 2A and 2B to route packets to/from the client terminals 1A, 1B, 1C and 1D. The mobile networks 2A and 2B are networks capable of providing wireless network connectivity to the client terminals 1A, 1B, 1C and 1D with location independence. Without limitation, the mobile networks 2A and 2B can include Global System for Mobile Communications, General Packet Radio Service, Enhanced Data rates for GSM Evolution Universal Mobile Telecommunications System, 3G, Wi-Fi, Unlicensed Mobile Access and Generic Access Network. The components and entities forming the mobile networks 2A and 2B are well known to those skilled in the art.

Servers 3A and 3B host services that are capable of communicating with client terminals 1A, 1B, 1C and 1D. The communication maybe bidirectional or unidirectional based on the type of service. For instance, a push notification session is a unidirectional communication mode for delivering notification messages from the server 3A or 3B to the client terminal 1A, 1B, 1C or 1D.

The servers 3A or 3B may be an independent service provisioning entity 3A, such as an internet based push service provider like MyWeather Mobile™, or it may be an enterprise network service provisioning entity 3B which is a part of an enterprise network 4B.

The independent service provisioning entity 3A has the flexibility of deciding on a security policy, a user selection policy, etc., whereas the enterprise network service provisioning entity 3B is restricted by the policies of enterprise network 4B. The enterprise network 4B may have a firewall regulating the traffic transmitted to/from the enterprise network 4B. In this way, the enterprise network 4B restricts the services of the server 3B to the members of the enterprise network 4B, thus to access services of the enterprise network service provisioning entity 3B a user must be a member of the enterprise network 4B.

Push technology is a unidirectional form of data communication where a request for a transaction originates at the server 3A or 3B. Thus, the push notification session involves unidirectional push of messages from the servers 3A and 3B to the client terminals 1A, 1B, 1C and 1D. The push notification session does not permit the client terminals 1A, 1B, 1C and 1D to transmit messages to the servers 3A and 3B. Thus, the client terminals 1A, 1B, 1C and 1D can only listen for notification messages pushed by the servers 3A and 3B.

The servers 3A and 3B may push notification messages to the client terminals 1A, 1B, 1C and 1D of its own volition, and may use HTTP server push and Java Pushlet, for pushing notification messages to the client terminals 1A, 1B, 1C and 1D.

Transmission of notification messages can be mediated by the push provisioning entity 102, which provides a persistent data communication channel to the client terminal 1A, 1B, 1C and 1D for delivering notification messages received from the servers 3A and 3B.

The push provisioning entity 102 requires an application on the client terminal 1A, 1B, 1C or 1D requiring a push notification session to register therewith. Registration involves the push provisioning entity 102 generating data identifying the push notification session, and storing a mapping between the data identifying the session and the requesting application. The mapping enables the push provisioning entity 102 to identify which application is associated with a given notification message received from the servers 3A and 3B, and route the received notification message to the identified application.

However, prior to application registration, the push provisioning entity 102 establishes a trust relationship with the corresponding client terminal 1A, 1B, 1C or 1D so that push notifications services can be provisioned to the applications thereon. This trust relationship has traditionally been done on the basis of a device certificate, which was provided the device on the client terminal 1A, 1B, 1C or 1D either by the device manufacturer, such as Apple™, or an Operating System (OS) developer, such as Microsoft™, and Google™, prior to a user procuring the device on the client terminal 1A, 1B, 1C or 1D. This restricts the capability of non-manufacturer or non-OS compliant devices to receive push notification services from the push provisioning entity 102.

Figure 2:
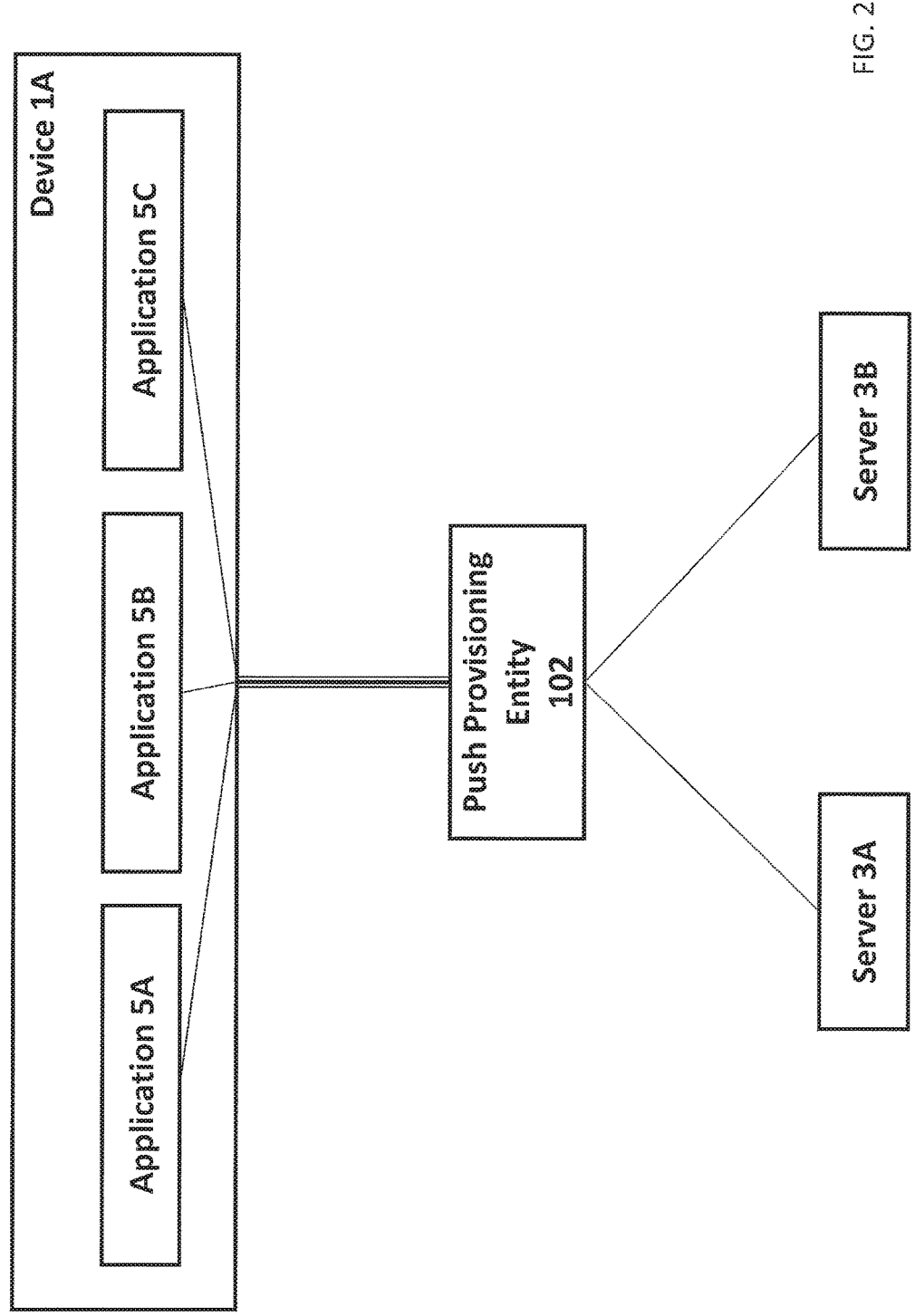
FIG. 2 is a block diagram showing an established push notification session via the push provisioning entity according to an embodiment.

Turning to FIG. 2, the client terminal 1A may comprise a plurality of applications, each of which 5A, 5B and 5C is capable of receiving push notification messages. According to conventional methods, each of the applications 5A, 5B and 5C requiring push notification service from the servers 3A or 3B would have to register with the push providing entity 102. The push provisioning entity 102 association each of the requesting application 5A, 5B or 5C with a push identifier. The requesting application 5A, 5B or 5C then supplies the push identifier to the corresponding server 3A or 3B. This concludes the establishment of the push notification channel, and thereafter the corresponding server 3A or 3B can transmit notification messages comprising the push identifier to the push providing entity 102 for delivery to the requesting application 5A, 5B or 5C. The push provisioning identifier 102 utilizes the mapping between the push identifier and its corresponding application 5A, 5B or 5C to generate routing instructions for the received notification message, and routes the message to the application 5A, 5B or 5C corresponding to the push identifier.

Thus, conventional mediated push methods merely establish a transmission path between the server 3A or 3B and the application 5A, 5B or 5C. This is because a communication channel merely represents a transmission path between communicating endpoints. Therefore, the conventional mediated push is limited to establishing a transmission path for delivering push notification message from a server to a device with a pre-provided certificate.

The channel established between the server 3A or 3B, and the application 5A, 5B or 5C does not have an associated validity period, thus, upon establishment of the channel, there are no means of verifying the integrity of the application 5A, 5B or 5C, or of the server 3A or 3B. Thus, the push notification channel is unsecure as regards handling of for sensitive notification messages.

The push provisioning entity 102, when configured according to the embodiments, is capable of provisioning a push notification session via the communications network 101 between the application 5A, 5B or 5C on the client terminal 1A and the server 3A or 3B corresponding to the application 5A, 5B or 5C.

Client terminals 1A, 1B, 1C and 1D have a first and a second operative state associated therewith. In the first operative state the applications 5A, 5B or 5C are enabled to request mediated push notification sessions from the push provisioning entity 102, and in the second state the applications 5A, 5B or 5C are unable to request the mediated push notification sessions.

Figure 3:
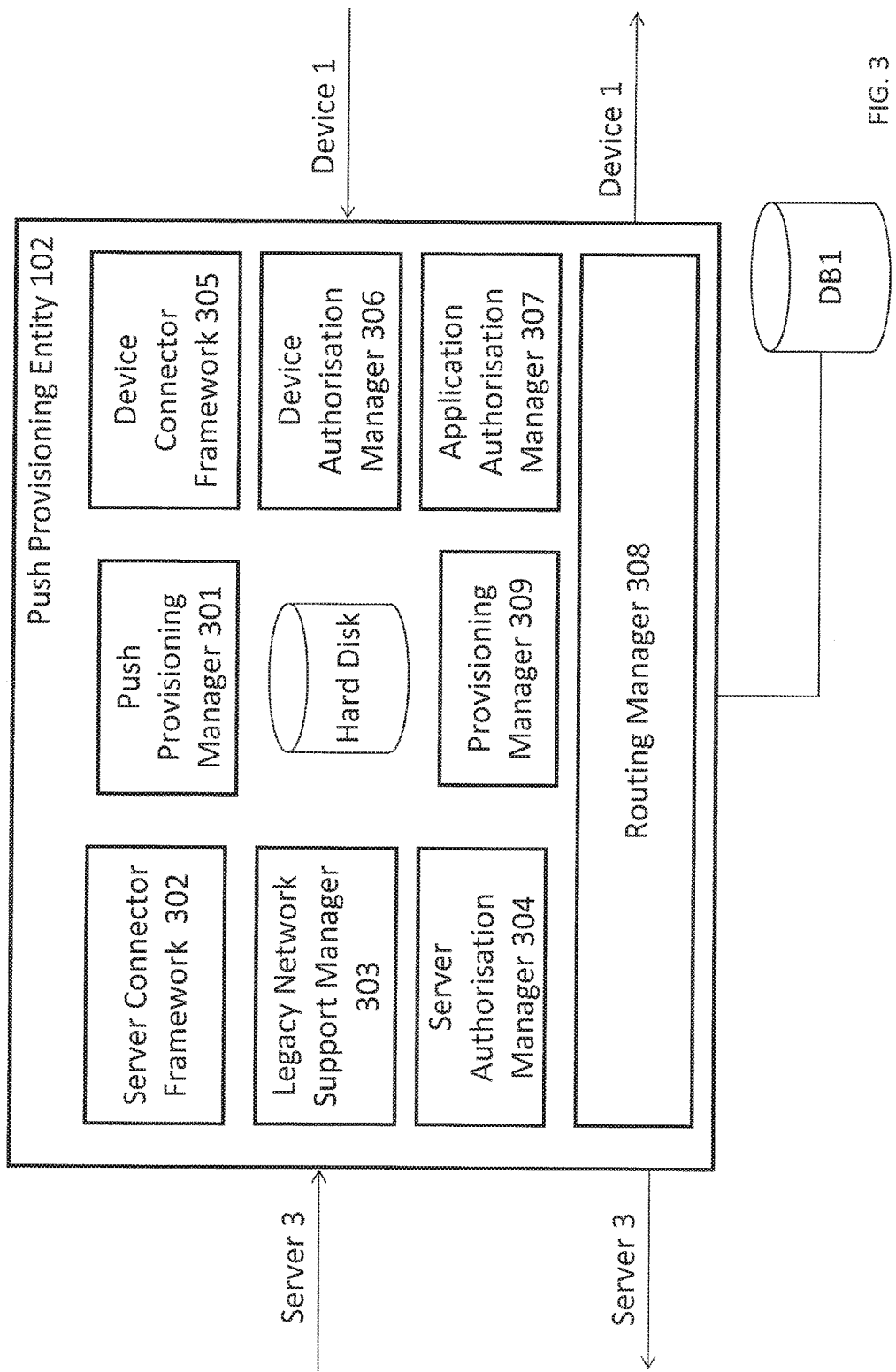
FIG. 3 is a block diagram showing the components of the push provisioning entity according to an embodiment.

Turning to FIG. 3, an arrangement of the push provisioning entity 102, when configured according to the embodiments will now be described. The push provisioning entity 102 comprises a combination of processing components including standard operating system components, memory, processor and permanent storage. The push provisioning entity 102 further cooperates with I/O communication interfaces.

In addition the push provisioning entity 102 comprises a provisioning manager 309, which is responsible for registering the client terminals 1A, 1B, 1C and 1D for the mediated push services. The transition of the client terminals 1A, 1B, 1C and 1D between the first and the second operative states is controlled by the provisioning manager 309.

The push provisioning entity 102 further comprises a device connector framework 305, which is capable of implementing a variety of communication protocols that enable client terminals 1A, 1B, 1C and 1D to communicate with the push provisioning entity 102. Without limitation, these protocols include Mobile Application Part (MAP) and Internet Protocol (IP). In addition to implementing the communication protocols, the device connector framework 305 controls the communication interfaces of the push provisioning entity 102 so as to enable client terminals 1A, 1B, 1C and 1D to communicate with the push provisioning entity 102.

The push provisioning entity 102 further comprises a routing manager 308, which directs a received message, such as a push notification provisioning request message, to the appropriate component, such as the provisioning manager 309, for processing. In addition, the routing manager 308 routes a communication message originating from the push provisioning entity 102, such as a configuration message, to an appropriate entity, such as a network gateway (not shown), to effect delivery of the communication message to the intended destination.

To enable communication between the push provisioning entity 102, and servers 3A and 3B, the push provisioning entity 102 further comprises a server connector framework 302. The server connector framework 302 implements the protocols that enable the servers 3A and 3B to communicate with the various components of the push provisioning entity 102. In addition, the server connector framework 302 controls the communication interfaces of the push provisioning entity 102 to enable communication between the push provisioning entity 102 and the servers 3A and 3B.

In addition to the standard server communication protocols, the push provisioning entity 102 maintains a plurality of legacy server communication protocols, such as the frame relay protocol, which are invoked, upon requirement, by a legacy network support manager 303 for use by the server connector framework 302. The legacy network support manager 303 also maintains a plurality of proprietary server communication protocols, which can also be invoked by the legacy network support manager 303 when communicating with a given server 3A or 3B utilizing the proprietary communication protocol.

Push Provisioning

The mechanism by which a given client terminal is configured into the first operative state will now be described. In the first instance the provisioning manager 309, responsive to receiving a push notification provisioning request message, or registration request, from the client terminal 1A, 1B, 1C or 1D, transmits a configuration message to the client terminal 1A, 1B, 1C or 1D whereby to configure the device into the first operative state. Thus, the provisioning manager 309 extends the capability of 'on demand' configuration of the client terminals 1A, 1B, 1C and 1D for push notification services. The configuration message transmitted by the provisioning manager 209 may comprise a certificate, or may comprise instructions facilitating acquisition of a certificate by the client terminal 1A, 1B, 1C or 1D. The transmission of the configuration message to the client terminal 1A, 1B, 1C or 1D by the provisioning manager 309 concludes the registration thereof.

The provisioning manager 309 may selectively transmit the configuration message on the basis of a predetermined condition. The predetermined condition may involve verifying the authorization status of the client terminal 1A, 1B, 1C or 1D corresponding to the provisioning request message.

The authorization status corresponding to the client terminals 1A, 1B, 1C and 1D is maintained by a device authorization manager 306 component of the push provisioning entity 102. The device authorization manager 306 may also maintain a list of prohibited devices, or a black list of devices. The enterprise network 4B may contribute to the development and maintenance of such a black list.

The predetermined condition may also involve verifying compliance with the various communication and/or security protocols present on the requesting client terminal 1A, 1B, 1C or 1D. Thus, for example, in absence of compliant protocols on the client terminal 1A, 1B, 1C or 1D, the provisioning manager 309 may defer the registration of client terminal 1A, 1B, 1C or 1D until the installation of the compliant protocols. Such compliant protocols may be provided to the client terminal 1A, 1B, 1C or 1D in a package by the push provisioning entity 102 or an entity cooperating with the push provisioning entity 102.

The package may be provided selectively to the client terminals 1A, 1B, 1C and 1D on the basis of authorization from the enterprise network 1B. The clients terminals 1A, 1B, 1C and 1D may obtain such authorization prior to transmitting the registration request or may obtain the authorization during the registration. In any event, the provisioning manager 309 would not provide the package to the client terminals 1A, 1B, 1C and 1D until such an authorization has been obtained. The package may also comprise proprietary protocols of the enterprise network 4B.

The provisioning manager 309 may permit the client terminal 1A, 1B, 1C or 1D to transit from the second state to the first state of its own volition, or may co-operate with the server 3A or 3B to ensure compliance with any sever policies. Thus, in case of restricted user base service providers, such as an enterprise network 4B, the push notification entity 102 can verify compliance to ensure that the requesting user is permitted to use the requested services.

In an arrangement such us where the applications 5A, 5B and 5C on the client terminal 1A correspond to both restrictive and unrestrictive service providers, the configuration message from the provisioning manager 309 causes the client terminal 1A to be configured in a third state, whereby the applications 5A, 5B and 5C are enabled to establish push notification sessions with the unrestrictive service providers, such as the server 3A, but not with the restrictive service providers, such as the server 3B. The provisioning manager 309 then transmits a conditional authorization message to the client terminal 1A, which then communicates with the enterprise network 4B to request transmission of an authorization message to the provisioning manager 309 so that it can transit into the first state. Alternatively, the push provisioning manager 309 may seek the requisite authorization from the enterprise network 4B directly without involving the client terminal 1A.

The enterprise network 4B may be permitted by the provisioning manager 309 to control authorization for services provided by entities therein or it may be permitted to control authorization for all the services available for consumption at the client device 1A. The client terminal 1A may have applications corresponding to a plurality of the restrictive service providers, each of which would have an authorization control for the mediated push provisioning for their corresponding services.

In the event that a user corresponding to a given client terminal 1A, 1B, 1C or 1D leaves the enterprise network 4B, the enterprise network 4B may transmit a message, whereby to change the authorization status associated with the given client terminal 1A, 1B, 1C or 1D to unauthorized. The change in the authorization status of the client terminal 1A, 1B, 1C or 1D would also restrict the applications thereon to establish push notification sessions with the enterprise network 4B. Thus, embodiments not only extend the scope of the mediated push services, but also enable effective authorization control by the enterprise network 4B.

The provisioning manager 309 may also establish an initial trust relationship with the servers 3A and 3B, and the enterprise network 4B associated therewith, whereby to vet the push service providers. The initial trust relationship with the servers 3A and 3B may be established by means of a registration process, wherein the server 3A or 3B requests authorization to provide the mediated push services via the push provisioning entity 102.

The provisioning manager 309 may evaluate the suitability of the server 3A or 3B, or the enterprise network 4B associated therewith for providing push notification services. The suitability may be evaluated on the basis of a predetermined rule, such as the nature of content provided.

A server authorization manager component 304 of the push provisioning entity 102 maintains the authorization status of the servers 3A and 3B. The provisioning manager 309 may conditionally register a given server 3A or 3B on the basis of the predetermined rule, whereby to restrict the mediated push services to the client terminals 1A, 1B, 1C and 1D, or users thereof, which are determined to meet the condition of the rule. For instance, if the provisioning manager 309 deems the content provided by a given server 3A or 3B to be suitable for a selection of users, such as pornographic content is determined to be suitable for users over the age of 18, then the server authorization manager 304 would associate the conditional rule with the given server 3A or 3B.

As discussed above, upon a given client terminal 1A being configured into the first operative state, the applications 5A, 5B and 5C on the client terminal 1A are enabled to request establishment of a mediated push notification session. In order to establish a push notification session, a given application 5A transmits a push notification session request to the push provisioning entity 102. Responsive to receiving the push notification session request, the routing manager 308 routes the request to a push provisioning manager 301. The push provisioning manager 301 then generates a token for use in validating the push notification session.

The push provisioning manager 301 may selectively generate the token on the basis of a predetermined criterion. The predetermined criterion may involve validating a record corresponding to the server 3A or 3B associated with the push notification session request message. The record may be maintained either locally at the push provisioning entity 102 or at any other entity remote from the servers 3A and 3B. The record comprises data indicative of whether the servers 3A and 3B is authorized to conduct push notification sessions. This record may be maintained in dependence on the authorization status of the servers 3A and 3B, as determined by the server authorization manager 304. Thus, the push provisioning manager 301 may prevent establishment of push notification sessions with unauthorized servers. The push provisioning manager 301 may determine a given server 3A or 3B corresponding to the given push notification session request message on the basis of the server application pairing maintained by an application authorization manager 307.

The application authorization manager 307 acquires the application and server pairings during establishment of the push provisioning entity 102's initial trust relationship with the server's 3A and 3B. In an arrangement such as where the push provisioning manager 301 receives a push notification session request message from a given application 5C which does not have a corresponding server pairing record at the application authorization manager component 307, the push provisioning manager 301 associates a condition with the record corresponding to the generated token, which causes such a pairing to be created when a message associated therewith is received from a corresponding server 3A or 3B. The provisioning manager 309 may require an unknown server to register therewith prior to establishing the requested push notification session.

The predetermined criterion may also involve verifying an authentication credential associated with the application 5A. The application authentication credential may be provided by the enterprise network 4B. The application authentication credential may be limited for a predetermined duration or number of uses, thus, for example, the enterprise network 4B may offer a limited use/duration trial of the services associated therewith. The application authentication credential may also be provided by the enterprise network 4B for longer durations or with no restrictions. The application authentication credential may alternatively be an application signature.

The predetermined criterion may further involve authenticating a user using the client terminal 1A. The authentication of the user establishes a trust relationship with the end user of the device, thereby restricting damage due to accidental use by an unauthorized user.

The predetermined criterion may also involve verifying an authentication credential associated with the server 3A or 3B corresponding to the application 5A. The push provisioning manager 301 determines the server 3A or 3B corresponding to the application 5A by looking up the server application pairings maintained by the application authorization manager component 307. In response to the determination, the push provisioning manager 301 can acquire an authentication credential therefrom.

In response to the selective generation of the token, the push provisioning manager 301 associates the generated token with the application 5A by generating a record corresponding so the requested push notification session, and storing data identifying the application 5A, the client terminal 1A, a session ID and the generated token therein.

The push provisioning manager 301 utilizes tokens so identify the record corresponding a particular push notification session, which then enables the push provisioning manager 301, in cooperation with the routing manager 308, to route notification messages to their corresponding applications 5A, 5B and 5C. Thus, tokens serve as a session identifier to the components of the push provisioning entity 102.

The push provisioning manager 301 then selectively transmits the token to the client terminal 1A for delivery to the application 5A, which is utilized by the application 5A in establishing the push notification session. The client terminal 1A, responsive to receiving the token, creates a record comprising data identifying the application 5A, the received token and the session ID.

As is well known in the art, a session is semi-permanent interchange of information between two or more computing devices. A session established at a certain point in time is torn down later. Since the token is used for validating a push notification session, embodiments introduce temporality in the generated session identification data, thereby restricting push communication between application 5A, 5B or 5C and server 3A or 3B for the duration of the session. Thus, applications 5A, 5B and 5C would have to request a new token every time it wishes to establish a push notification session.

By contrast, the prior art methods do not limit the validity of the application registration for push services. This makes the prior art methods unsuitable for providing secure messages via push notifications. For example, consider the scenario, where a client terminal 1A comprising an application 5A having access to the enterprise network 4B's push notification service 3B changes owners, wherein the new owner is not authorized to use the services of the enterprise network 4B. In this scenario, the new owner can gain access to the notification messages transmitted to the application 5A by the server 3B. This is because the trust relationship in the prior art methods is never renewed.

By contrast, embodiments require the application to renew this trust relationship every time it wishes to establish a push notification session, when a given application's suitability for continued reception of further push notification messages can be verified. The embodiment validates the application 5A for receiving push notifications for a limited timeframe, i.e. by evaluating the application 5A's suitability for establishing a session as opposed to a channel.

Turning to the establishment of the push notification session, in the event that the applications 5A, 5B and 5C are capable of requesting push notification session from the push provisioning manager 301, the push provisioning manager 301 generates a different token for each respective application in response to receiving push notification session request message from the application 5A, 5B or 5C. Thus, registration of a given application 5A, 5B or 5C is independent of registration of any other application.

As a different token is generated for each push notification session between same or different endpoints, i.e. the applications 5A, 5B and 5C, and the servers 3A and 3B, the validity of the token is linked to the validity of the associated push notification session. Thus, the token is effectively a one-time password that is supplied by the push provisioning manager 301 for use in establishing and conducting a given push notification session. Therefore, the token may utilized as a session validity credential.

Figure 4:
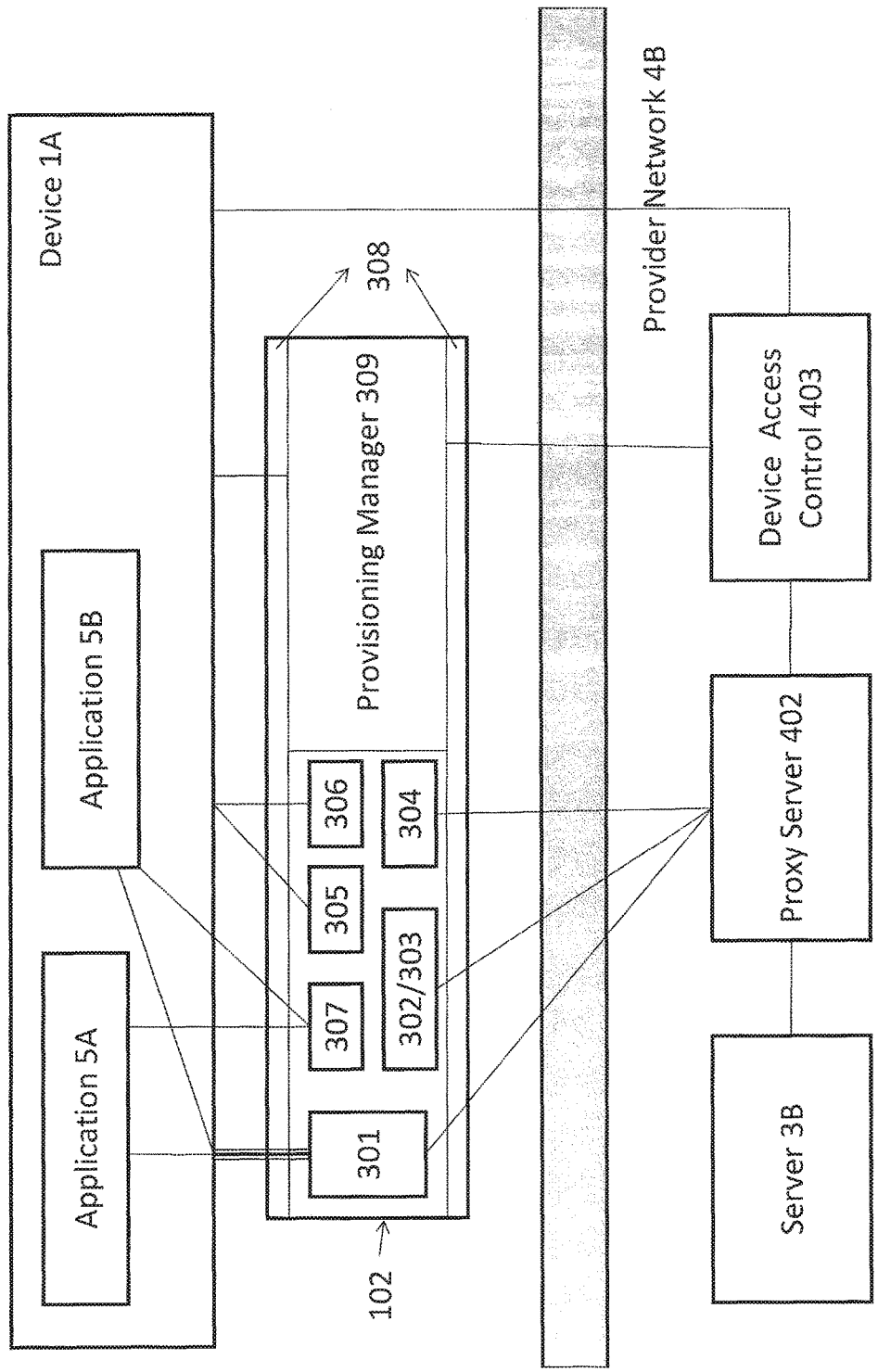
FIG. 4 is a block diagram showing the interaction of the components of the push provisioning entity with the application and the server according to an embodiment.

Turning to FIG. 4, an arrangement for establishing a push notification session between the applications 5A and 5B, and the server 3B of the enterprise network 4B will now be described. In addition to the server 3B, the enterprise network 4B comprises a firewall 401 that regulates the passage of packets in and out of the enterprise network 4B. The enterprise network 4B may additionally comprise a device access control entity 403 that maintains a list of client terminals 1A, 1B, 1C and 1D that have access to the services provided by the enterprise network 4B, including the push notification service of the server 3B. The device access control entity 403 keeps track of changes in access authorization associated with the client terminals 1A, 1B, 1C and 1D.

The device access control entity 403 may co-operate with the provisioning manager 309 so as to notify the push provisioning entity 102 regarding the client terminals 1A, 1B, 1C and 1D that are authorized to establish a given mediated push notification session.

The device access control entity 403 may control authorization of the applications 5A, 5B or 5C to establish push notification sessions by communicating application authorization details to the application authorization manager 307. The application authorization manager 307 can then restrict the token generation to applications 5A, 5B or 5C that have authorization to establish a push notification session.

The sequence of steps leading to the establishment of a push notification session between the application 5A residing on the terminal 1A with the server 3B will now be described with reference to FIG. 5. To recap, before the applications 5A, 5B and 5C can establish mediated push notification sessions via the push provisioning entity 102, the client terminal 1A has to complete registration with the provisioning manager 309. Client terminal 1A receives a configuration message (step 5.2) in response to transmitting a provisioning request message (step 5.1), which triggers the client terminal 1A to configure itself into the first operative state. In which, the applications 5A, 5B and 5C on the client terminal 1A are enabled to establish push notification sessions.

Application 5A initiates establishment of a given push notification session by transmitting a request for the given push notification session to the client terminal 1A (step 5.3), which then transmits a request for a token to the push provisioning manager 301 (step 5.4).

The push provisioning manager 301 then generates a token (step 5.5) for use in validating the requested push notification session. As discussed above, the token may be generated in dependence on the predetermined criterion. Upon generating the token, the push provisioning manager 301 transmits the token to the client terminal 1A (step 5.6), which then passes the received token to the application 5A. In response to receiving the token, the application 5A provides the received token to the corresponding server 3A or 3B so as to establish the push notification session (steps 5.11, 5.12 and 5.13).

The delivery of the token to the corresponding server 3B is not limited to a specific protocol or communication medium. The application 5A may utilize any communication protocols or mediums available therewith to provide the token to the corresponding server 3B. Without limitation the communication protocols may include connectionless protocols, such as user datagram protocol connection oriented protocols, such as transmission control protocol, store-and-forward protocols, such as Email, mobile messaging services, such as short message service, point-to-point communication protocol, such as Bluetooth™, or point-to-multipoint communication protocols, such as Internet Group Multicast Protocol. Without limitation the application 5A may utilize any wireless, such as Wi-Fi or Global System for Mobile Communications (GSM), or wired, such as Ethernet, communication mediums that are available on the terminal 1A for transmitting the token.

In the event that the application 5A does not have the contact details, such as the IP address, of the server 3B or the server 3B is unreachable, the application 5A may seek assistance from the push provisioning manager 301 by sending a server connection request message (step 5.8).

The assistance may be provided by the push provisioning manager 301 by supplying the contact details of the server 3B to the application 5A. The application 5A may then communicate with the server 3B with these contact details so as to provide the token to the server 3B. Alternatively, the push provisioning manager 301 in cooperation with the routing manager 308 may identify a network node to transmit a received server access request from the application 5A, and transmit the request to the identified node, thereby facilitating provisioning of the token from the application 5A to the server.

The network node may be the server 3B itself or an entity, such as a proxy server 402, associated with the server 3B (as shown on step 5.9 of FIG. 5), which applies the policies of the enterprise network 4B to the packets to/from the server 3B. The policies may involve encrypting and decrypting packets to/from the server 3B.

The network node may alternatively be a secure connection mediation entity, or a relay server, associated with the server 3B, which may be internal or external to the enterprise network 4B.

The application 5A can then establish a connection with the server 3B for delivering the token. The connection may either be established by the application 5A, or the client terminal 1A on behalf of the application 5A.

Figure 5:
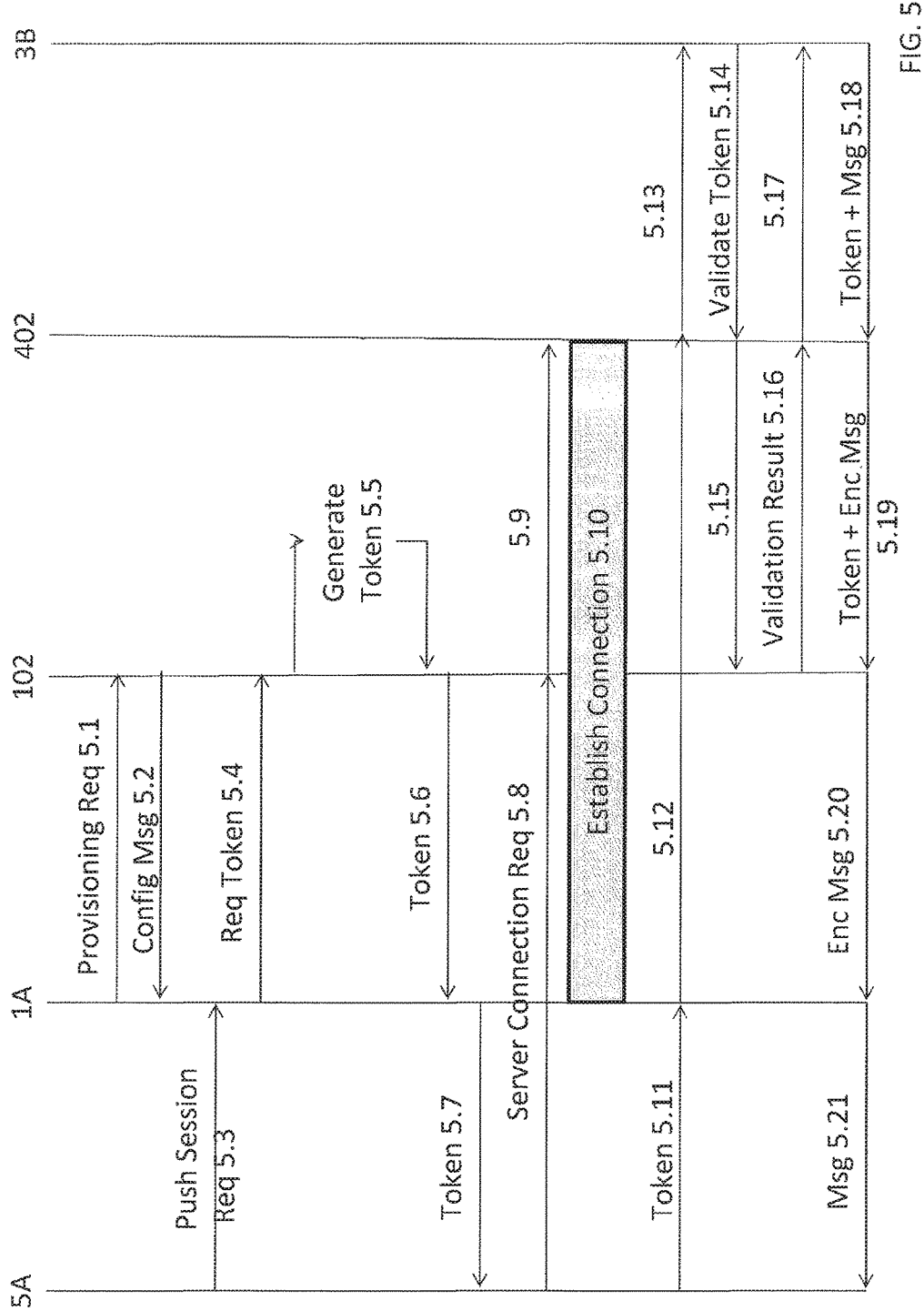
FIG. 5 is a timing diagram showing steps performed by the components shown in FIG. 2 when establishing a push notification session according to an embodiment.

When the connection is established between the client terminal 1A and the proxy server 402, the application 5A transmits the token to the server 3B via the client terminal 1A and the proxy server 402 (as shown on steps 5.11, 5.12, and 5.13 of FIG. 5). In response to receiving the token, the server 3B may establish the push notification session.

The server 3B may alternatively confirm the validity of the token with the push provisioning manager 301 prior to establishing the push notification session. To validate the token, the server 3B transmits a token validation request comprising the token received from the application 5A to the push provisioning manager 301. The token validation request may be transmitted directly by the server 3B to the push provisioning manager 301. Alternatively and as shown in FIG. 5, the server 3B may transmit the token validation request via the proxy server 402 (steps 5.14 and 5.15).

In response to receiving the token validation request, the push provisioning manager 301 evaluates whether the received token corresponds to the token provided to the application 5A for the push notification session so as to enable the push notification session between the server 3B and the application 5A.

The push provisioning manager 301 may then selectively transmit an authorization message to the server 3B in dependence on the evaluation, whereby to enable the push notification session. Therefore, the push provisioning manager 301 comprises means for preventing establishment of the push notification sessions corresponding to bogus or invalid tokens.

Thus, in the event that the token received from the server 3B corresponds to the token provided to the application 5A, the push provisioning manager 301 would selectively transmit the authorization message to the server 3B. The authorization message may, as shown in FIG. 5, be transmitted via the proxy server 402 (steps 5.16 and 5.17), or may be transmitted directly to the server 3B.

The push provisioning manager 301 may selectively transmit the authorization message in dependence on a predetermined authorization criterion. The predetermined authorization criterion may involve verifying authenticity of the server 3B, e.g. on the basis of an authentication credential associated therewith. The push provisioning manager 301 may acquire an authentication credential of the server 3B by transmitting an authentication credential request thereto, in response to receiving the token validation request. The predetermined authorization criterion may also involve verifying the association between the server 3B and the application 5A by reviewing server to application pairings maintained by the application authorization manager 307.

In the event that the tokens do not correspond to each other or the predetermined authorization condition is not satisfied, the push provisioning manager 301 considers the evaluation to have failed. The push provisioning manager 301 may selectively transmit an error message to the server 3B, thereby causing the push notification session establishment to be terminated.

The push provisioning manager 301 may update the session state associated with the push notification session in dependence on the evaluation. For example, session state may be updated from pending to invalid, if the evaluation fails.

In the event that the evaluation is successful, the push provisioning manager 301 marks the push notification session as valid upon transmitting the authorization message, and updates the session state of the corresponding push notification session accordingly.

The server 3B determines the outcome of the token validation request on the basis of any received response messages, such as error or authorization messages, from the push provisioning manager 301. If the server 3B does not receive any messages within a predetermined time period of sending the token validation request, the server 3B may consider the evaluation to have been unsuccessful or may retransmit the token validation request.

In the event that the server 3B receives the error message, the server 3B terminates establishment of the push notification session, and may transmit a failure message to the application 5A, either directly or via the push provisioning entity 102. The application 5A may then reattempt establishment of the push notification session by transmitting a further push notification session request message to the push provisioning manager 301 (step 5.3).

In the event that the server 3B receives an authorization message indicative of successful authorization, the server 3B concludes establishment of the push notification session. The server 3B may then begin transmitting notification messages to the application 5A utilizing the established push notification session.

Notification messages may be utilized by the server 3B to convey information to the application 5A or the user associated therewith, such as a new email notification to the application 5A or status updates. Notification message may comprise textual, graphical, audio, video or multimedia data. The server 3B could also utilize notification messages to transmit instructions to the application 5A. The instructions define the steps to be executed by the application 5A on the client terminal 1A. Without limitation, the instructions may include steps to update the underlying application software, invoke an application functionality, etc.

In response to a notification message at the server 3B for the application 5A, the server 3B packages the notification message and the corresponding token, and transmits the notification message to the push provisioning manager 301.

Alternatively and as shown in FIG. 5, the server 3B transmits the package to the proxy server 402, which then transmits it to the push provisioning manager 301 (steps 5.18 and 5.19).

The notification message may be transmitted in an unencrypted or encrypted form to the push provisioning manager 301. As will be known to the skilled person, the encrypted message would limit the access to the contents of the notification message to the intended application 5A. The notification message may be encrypted by the server 3B. Alternatively and as shown in FIG. 5, the notification message may be encrypted by the proxy server 402 to ensure compliance with security policies of the enterprise network 4B (step 5.19). Encryption may be based on a pre-negotiated encryption criterion.

The push provisioning manager 301, in response to receiving the package, extracts the token from the package and utilizes the extracted token to retrieve the record corresponding to the associated push notification session.

The push provisioning manager 301 may then evaluate the token on the basis of a predetermined evaluation condition, such as the validity of the token. The push provisioning manager 301 validates the token by verifying whether the received token corresponds to the token provided to the corresponding application 5A for this push notification session. As discussed above, the token also serves as session validity credential, so that the validity of the token additionally verifies the validity of the associated push notification session. The predetermined evaluation condition may also involve verifying whether the server 3B is authorized to transmit notification messages over this push notification session.

In the event that the token evaluation is unsuccessful or the token does not have any corresponding records, the push provisioning manager 301 discards the received package. The push provisioning manager 301 may further transmit an error message to the server 3B and/or the application 5A.

Responsive to receiving the error message, the server 3B may transmit a token validation request message to establish the validity of the token (steps 5.14 and 5.15) or may retransmit the notification message (steps 5.18 and 5.19). In the event that the token validation fails or a further error message is received the server 3B may terminate the push notification session. The server 3B may also transmit a tear down message to the push provisioning manager 301, whereby to terminate the push notification session and release any network resources that may have been reserved therefor. The push provisioning manager 501 may further transmit the tear down message to the application 5A.

The push provisioning manager 301 may monitor the failed token validations on the basis of a predetermined monitoring criterion so as to determine a likelihood of token corruption. The predetermined monitoring criterion may include number of consecutive failed token validations, e.g. push notification sessions with more than three consecutive token validation failures. The predetermined monitoring criterion may also include frequency of token validation failures from a given server 3A or 3B. The push provisioning manager 301 may further control the push notification session on the basis of the determined likelihood, such as if the likelihood of token corruption is high, the push provisioning manager 301 may terminate the push notification session by changing the validity of the associated token as invalid.

The push provisioning manager 301 may also scan the received notification message so as to detect any malicious notification messages. A given notification message may be determined to be malicious on the basis of the suitability of content and/or instruction comprised therein. The scanning may comprise evaluating the data of the notification message to determine whether it is appropriate for the intended recipient. The scanning may further comprise evaluating the instructions to determine whether they are safe to be executed on the client terminal 1A, thereby preventing malicious or dangerous instructions to be executed on the client terminal 1A.

In the event that the notification message is determined to be malicious, the push provisioning manager 301 discards the notification message without transmitting it to the client terminal 1A. The push provisioning manager 301 may also transmit an error message to the server 3B comprising data indicative of the scanning outcome. The push provisioning manager 301 may also monitor malicious messages so as to determine safeness of the servers 3A and 3B, and utilize the safeness parameter to selectively permit the servers 3A and 3B to provide notification messages to the applications 5A, 5B and 5C.

The notification message from the servers 3A or 3B may also cause the push provisioning manager 301 to generate an instruction for the application 5A. The instruction defines steps to be executed by the application 5A on the client terminal 1A. For example, if the notification message notifies the application 5A that the underlying application software is to be updated, the push provisioning manager 301 may generate instructions for effecting the software update.

The push provisioning manager 301 then selectively transmits the received notification message, and any instructions, to the client terminal 1A for delivery to the corresponding application 5A (step 5.20). Responsive to receiving the notification message, the client terminal 1A passes the notification message to the corresponding application 5A (step 5.21).

In the event that the notification message is encrypted and the decryption keys are maintained by the client terminal 1A, the client terminal 1A decrypts the notification message before transmission to the application 5A (step 5.21). Alternatively and if the decryption key is maintained by the application 5A, the client terminal 1A transmits the encrypted message to the application 5A.

The push provisioning manager 301 may transmit a plurality of notification messages received from the servers 3A and/or 3B destined for any of the applications 5A, 5B and/or 5C on the client terminal 1A in a multiplexed package. Thus, for example, if the push provisioning manager 301 receives a first notification message from the server 3A for the application 5C and a second notification message from the server 3B for the application 5A, then the push provisioning manager may multiplex the first and second notification messages in a package, and deliver the multiplexed packaged to the client terminal 1A. In response to receiving the multiplexed package, the client terminal 1A would extract the first and second notification messages and provide them to the applications 5C and 5A respectively. The push provisioning manager 301 may multiplex notification messages received within a predetermined time period.

As regards the steps for establishing a push notification session between the applications 5A, 5B and 5C on the client device 1A and the server 3A via the push provisioning entity 102, it is to be understood that the steps up to the acquisition of the token by the applications 5A, 5B and 5C, i.e. steps 5.1 to 5.7, are similar to those as described in relation the server 3B above. In response to the acquisition of the token, the applications 5A, 5B and 5C transmit the token to the server 3A either directly or in cooperation with the push provisioning entity 102. The server 3A may then verify the authenticity of the token by communicating with the push provisioning entity 102. As will be understood, communication between the server 3A, and the push provisioning entity 102 and/or the client device 1A does not involve the relay server 601 and the proxy server 402.

Mediated Terminal-Server Connection Establishment

Figure 6:
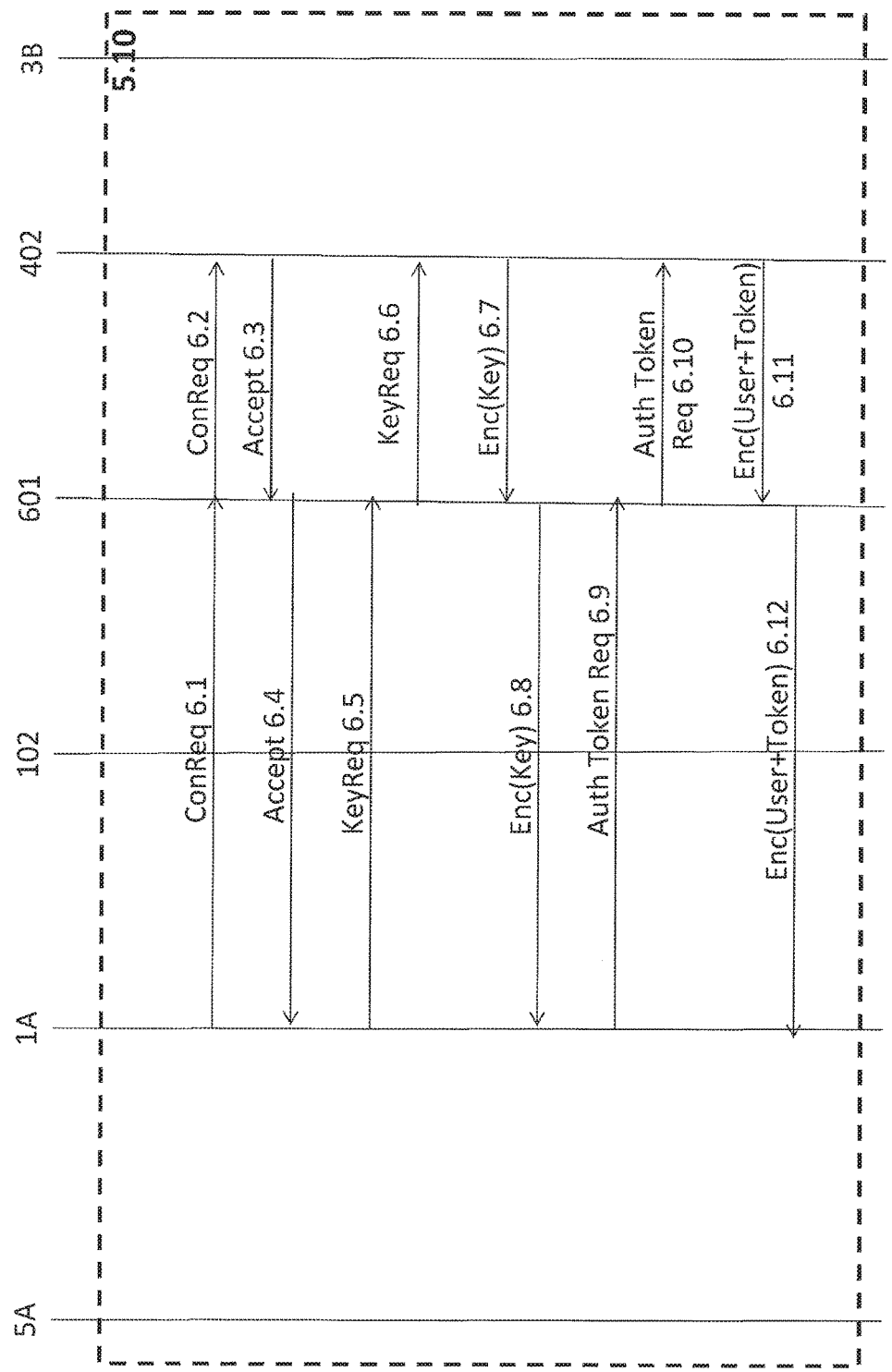
FIG. 6 is a timing diagram showing steps performed by the components shown in FIG. 2 when establishing an encrypted communication session between the client terminal and the server according to an embodiment.

As discussed above, the communication connection for delivering the token from the application 5A to the server 3B could either established between the application 5A and the server 3B, or could be established between the enterprise network 4B and the client terminal 1A (step 5.10). An example of the latter mediated by the relay server 601 will now be explained with reference to FIG. 6. The relay server 601 enables establishment of a secured connection when there is a mismatch between the communication protocols and/or capability of the client terminal 1A and the enterprise network 4B. The relay server 601 may also be utilized to conceal the contact details of the enterprise network 4B.

The client terminal 1A initiates the connection establishment process by transmitting a connection request to the relay server 601 (step 6.1). The client terminal 1A may transmit the connection request directly to the relay server 601 (step 6.1). Alternatively, the client terminal 1A may transmit the connection request via the push provisioning manager 301.

In response to receiving the connection request, the relay server 601 selectively transmits the connection request on the basis of a predetermined connection condition to a connection establishment entity, such as the proxy server 401, of the enterprise network 4B (step 6.2). The predetermined connection condition may involve determining whether a malicious software scan, or a virus scan, has been conducted on the client terminal 1A. The predetermined connection condition may also include verifying an authentication credential associated with the client terminal 1A, the application 5A, or the user associated therewith.

The predetermined connection condition may also involve verifying an authorization state corresponding to the client terminal 1A and/or the application 5A. The authorization state may be maintained locally at the relay server 601, or may be retrieved from the enterprise network 4B. The relay server 601 may also generate the authorization state on the basis of outcomes of previous connection requests. Thus, the relay server 601 comprises means for filtering connection requests.

The push provisioning manager 301 may monitor the authorization state maintained at the relay server 601 so as to control associated push notification sessions. The monitoring of authorization state may be conducted depending on the session state of associated push notification sessions. The push provisioning manager 301 may also utilize the authorization state in selective generation of tokens for any further push notification sessions.

In response to receiving the connection request, the proxy server 402 selectively accepts the connection request by transmitting an accept message to the relay server 601, if the client terminal 1A is permitted to establish a secured connection with the enterprise network 4B (step 6.3). The relay server then transmits the accept message to the client terminal 1A (step 6.4). The client terminal 1A transmits a key request to the proxy server 402 via the relay server 601 (steps 6.5 and 6.6). The proxy server 402 subsequently supplies the encryption keys, preferably encrypted with a pre-shared secret, for use in communication with the enterprise network 4B. The keys are transmitted to the client terminal 1A via the relay server 601 (steps 6.6 and 6.7). The client terminal 1A then requests an authentication token, different to the push notification session token, from the proxy server 402 (steps 6.8 and 6.9).

Preferably, authentication tokens are representative of an enterprise authentication credential, such as a shared secret, which may be valid for a specified period of time or until a specified even, such as termination of associated secured connection. As will be appreciated, upon expiry of authentication tokens, transmission of push notification messages to associated client terminals may be suspended, until associated authentication token has been revalidated or a new authentication token has been obtained.

In response, the proxy server 402 generates the authentication token for use in validating the secured connection, and packages it with an identity of the user of the client terminal 1A. The user identification and authentication token package is then encrypted and transmitted to the client terminal 1A via the relay server 601 (steps 6.10 and 6.11), thereby establishing the secured connection between the enterprise network 4B and the client terminal 1A.

After establishment of the connection between the client terminal 1A and the enterprise network 4B, the application 5A transmits the push notification session token to the server 3B so as to establish the push notification session. As discussed above, the server 3B may then establish the validity of the received token from the push provisioning manager 301 prior to establishing the push notification session, or may establish the push notification session without any token validation.

Figure 7:
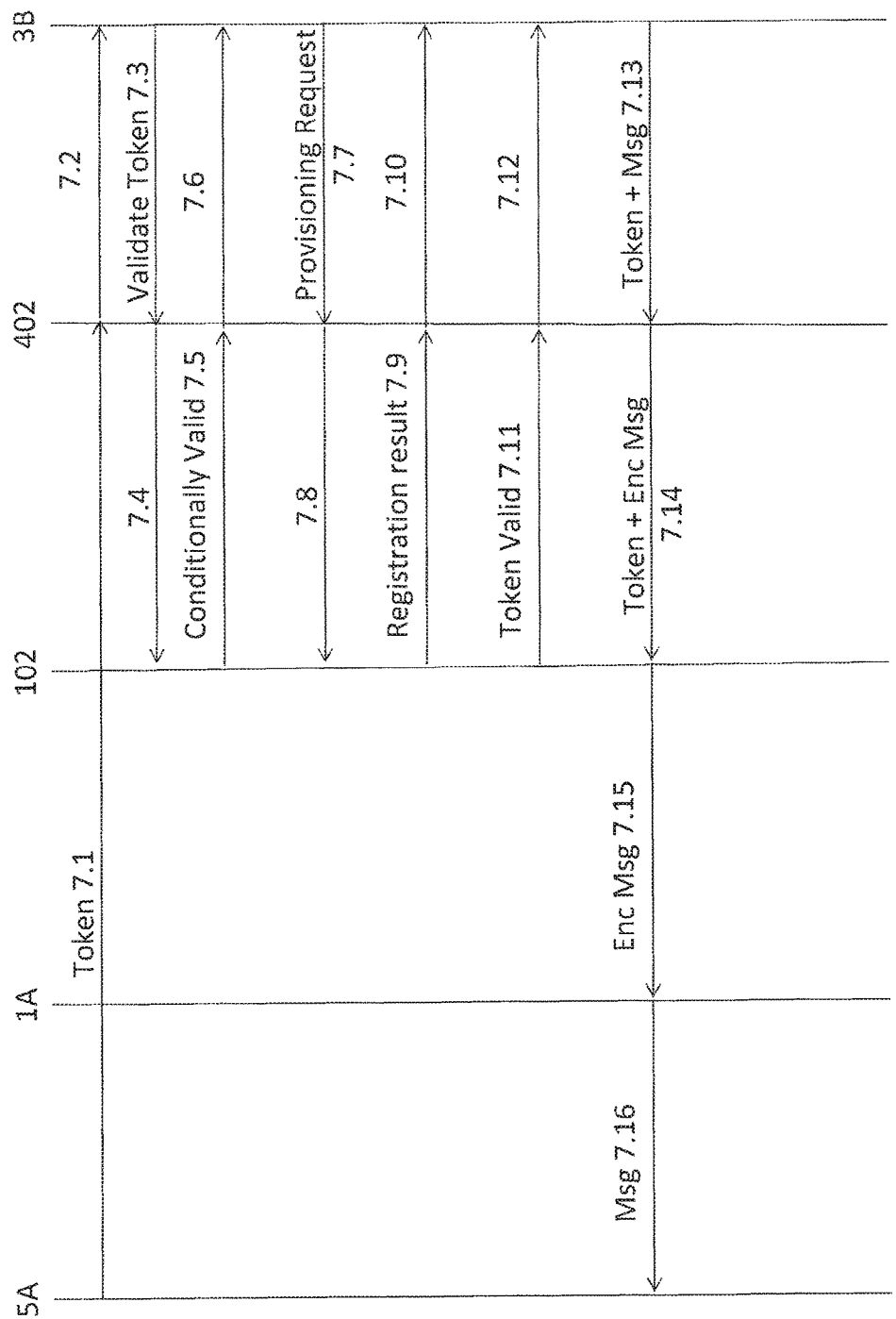
FIG. 7 is a timing diagram showing steps performed when validating a push notification session according to an embodiment.

An example of a validated push notification session establishment will now be described with reference to FIG. 7. In particular, FIG. 7 exemplifies an arrangement, where the application 5A requests establishment of a push notification session with the server 3B that has not been registered with the push provisioning entity 102.

In response to receiving the token from the application 5A (steps 7.1 and 7.2), the server 3B transmits the token to the push provisioning manager 301 for validation (steps 7.3 and 7.4).

In response to receiving the token validation request, the push provisioning manager 301 determines whether the received token corresponds to the token provided to the application 5A for this push notification session and updates the record corresponding to the push notification session on the basis of the determination.

The push provisioning manager 301 may selectively reserve communication network resources in dependence on the determination. The reserved resources may include communication ports, bandwidth and quality of service parameters, such as priority.

In the event that the received token is determined to be compatible with the token provided to the application 5A, the push provisioning manager 301 may selective transmit an authorization message to the server 3B on the basis of a predetermined rule (steps 7.11 and 7.12). The predetermined rule may involve verifying an authentication credential associated with the server 3B.

The predetermined rule may also involve verifying whether the server 3B has been scanned for the presence of malicious software. The predetermined rule is satisfied, if the scanning has occurred on the server 3B. Thus, the push provisioning manager 301 prevents unsafe servers from transmitting notification messages.

The predetermined rule may further involve verifying the record corresponding to the server 3B. As discussed above, the record is maintained by the server authorization manager 304 and comprises data indicative of whether the server 3B is authorized to conduct the push notification session. In the event that the server 3B is not authorized to conduct the push notification session, the push provisioning manager 301 marks the token as invalid, thereby preventing establishment of the push notification session.

In the event that the server 3B, or the enterprise network 4B, is not recognized by the push provisioning manager 301, i.e. there is no corresponding record, the push provisioning manager 301 may transmit a conditional authorization message instructing the server 3B to register with the provisioning manager 309 (steps 7.5 and 7.6). The registration process causes a record corresponding to the server 3B to be generated at the push provisioning entity 102.

To initiate the registration process, the server 3B transmits a provisioning request message to the provisioning manager 309 (steps 7.7 and 7.8). The provisioning manager 309 then processes the provisioning request in accordance with steps described above. The provisioning manager 309 may then selectively transmit a registration result message to the server 3B, whereby to inform the server 3B regarding the outcome of the registration request (steps 7.9 and 7.10).

The provisioning manager 309 additionally informs the push provisioning manager 301 regarding the outcome of the server 3B's registration request, which then processes the pending conditional validation on the basis of the outcome. In the event that the server 3B was successfully registered, the push provisioning manager 301 may selectively transmit a token valid message to the server 3B, whereby to confirm the validity of the token (steps 7.11 and 7.12). Thus, the push provisioning manager 301 is capable of registering new services 'on demand', thereby removing the requirement of prior registration for services. The server 3B may then transmit notification messages to the application 5A as described above (steps 7.13 to 7.16).

In any event, if the token received from the server 3B for validation at step 7.4 is determined to be conflicting with the token provided to the application 5A, the push provisioning manager 301 terminates the establishment of the push notification session by marking validity of the token as invalid. The push provisioning manager 301 may transmit a tear down message to the application 5A.

Reception of the token valid message at the server 3B concludes the establishment of the push notification session between the application 5A and the server 3B. The server 3B may then transmit notification messages to the application 5A via the push provisioning manager 301 (steps 7.13 to 7.16).

Status Monitoring

In addition to delivering notification messages to the applications 5A, 5B and 5C, the push provisioning manager 301 may also monitor an operational state associated with the server 3B. As is well known in the art, operational statuses are indicative of whether a given server is active, inactive, operable or inoperable. An exemplary embodiment describing operational state monitoring of the server 3B will now be explained with reference to FIG. 8.

The push provisioning manager 301 comprises a monitoring interrupt that causes the push notification manager 301 to determine the operational state of the server 3B (step 8.2). For example, the push provisioning manager 301 determines an operational state of the server 3B on the basis of a predetermined inactivity period associated therewith. In other words, if components of the push provisioning entity 102 have not received any communication from the server 3B, it would be considered inactive by the push provisioning manager 301. The communication received from the server 3B may be a notification message, a token validation message, a server provisioning message, etc., and the server 3B would be considered inoperable by the push provisioning manager 301 when it is not capable of communicating therewith. For example, in the event of a server crash (step 8.1), the server 3B will be inactive and inoperable until it recovers from the crash.

The server 3B, or any entity associated therewith, such as the proxy server 402, may transmit a server operational status update message so as to indicate to the push provisioning manager 301 that the server 3B is operable or inoperable. The server operational status update message may be transmitted periodically by the server 3B or during inactive periods.

Alternatively, for each of the inactive servers 3A or 3B, the push provisioning manager 301 transmits a server status enquiry message that causes the server 3B to transmit the server operational status update message. The server status enquiry message may be transmitted directly to the server 3B.

Figure 8:
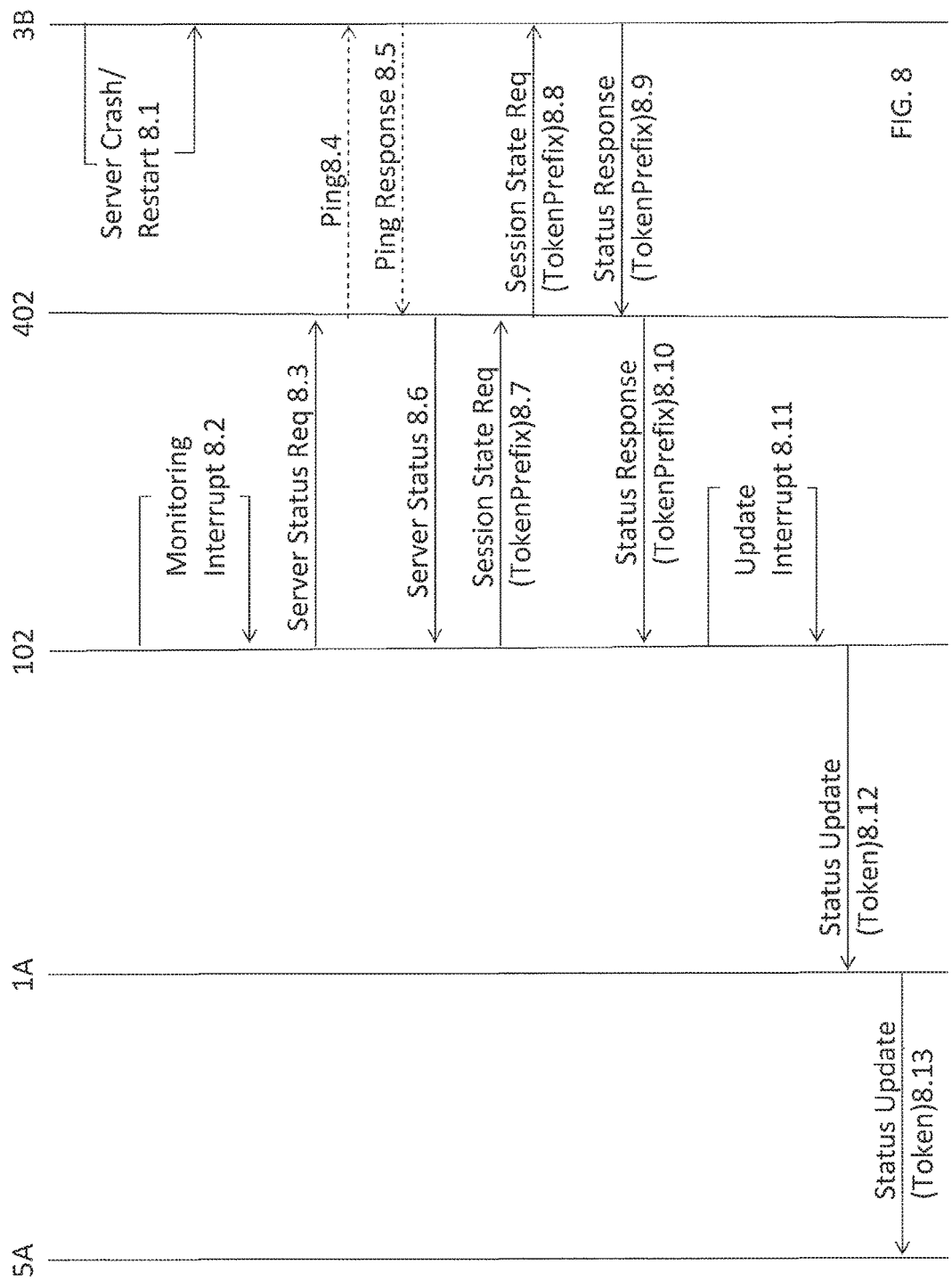
FIG. 8 is a timing diagram showing steps performed to maintain a server side context of the push notification session according to an embodiment.

Alternatively and as shown in FIG. 8, the push provisioning manager 301 transmits the server status enquiry message to the proxy server 402 (step 8.3). The proxy server 402 then establishes the operation status of the server 3B by transmitting a ping message thereto (step 8.4) and generating a server status update message in dependence on the ping response, if any (step 8.5). The proxy server 402 then transmits the generated server status update message to the push provisioning manager (step 8.6).

As will be understood, ping messages may comprise any suitable mechanisms, such as the Internet Control Message Protocol (ICMP) ping utility, for determining the operational status of servers 3A and 3B.

In case the push provisioning manager 301 does not receive any server status update messages or any other communication messages from the server 3B within a predetermined time period, the push provisioning manager 301 considers the server 3B to be inoperable. The push provisioning manager 301 may reattempt establishing the operational status of the server 3B.

In the event that the server 3B is determined to be inoperable, the push provisioning manager 301 marks tokens corresponding to push notification sessions associated with the server 3B as invalid, and transmits a push notification session tear down message to all the corresponding applications 5A, 5B and 5C.

In addition to the operational state of the server 3B, the push provisioning manager 301 may also determine a session state of push notification sessions. The session state may be determined on the basis of a predetermined inactivity period associated therewith.

The session state may also be determined on the basis of a session status response message, which may be generated by the server 3B of its own volition, or in response to a session state request message from the push provisioning manager 301. In the latter scenario, the push provisioning manager 301 transmits a session status request message comprising a token prefix to the server 3B, either directly or via the proxy server 402 (steps 8.7 and 8.8). The push provisioning manager 301 may combine the session status request message with a server status enquiry message. The token prefix may correspond to the token of a given push notification session or a plurality of push notification sessions. The token prefix may comprise parts of push notification token that are suitable for identifying a given push notification session and/or a given push notification token, without including all the parts of push notification token, thereby preventing disclosure of push notification tokens to servers 3A and 3B that are unknown to them.

In the event that the token prefix corresponds to a given push notification session, the server 3B determines the session state, i.e. operable or inoperable, and transmits data identifying the determined state to the push provisioning manager 301 (steps 8.9 and 8.10). In response to receiving the session status response message, the push provisioning manager 301 maintains (e.g.: updates) the validity of the token corresponding to the given push notification session in dependence on the associated session state.

When the token prefix corresponds to a current push notification session, the server 3B determines the session state corresponding to the push notification session, and transmits data identifying the sessions states corresponding to, at least, any inoperable push notification session to the push provisioning manager 301 (steps 8.9 and 8.10). The push provisioning manager 301 then maintains the validity of the tokens corresponding to each of the plurality of the push notification session on the basis of their corresponding session state.

In the event that the session state of a given push notification session indicates that the given push notification session is inoperable, the push provisioning manager 301 terminates the given push notification session by changing the validity of the associated token to invalid, thereby terminating the push notification session. The push provisioning manager 301 may also transmit a push notification session tear down message to associated application 5A, 5B or 5C.

The push provisioning manager 301 may also transmit a session status notification message to the application 5A associated with a given push notification session in dependence on the session state (steps 8.12 and 8.13). Alternatively, the push provisioning manager 301 may transmit the session status notification message to the corresponding application 5A periodically on the basis of an update or heartbeat interrupt (step 8.11). The session status notification message may alternatively be transmitted to the corresponding application 5A in response to an update in the session state or when the push notification session is determined to be inoperable. Thus, the push provisioning manager 301 can control the push notification session by means of the session status notification message.

Application Status Monitoring

The steps involved in monitoring the status of the application 5A will now be described with reference to FIG. 9. The status of the application 5A may become inoperable, if it is determined to be inaccessible by the client terminal 1A or the push provisioning manager 301. The application 5A may be determined to be inaccessible due to either the application failure, such as the application software crash (step 9.1), or the client terminal 1A failure. The application status may be determined by the push provisioning manager 301 by monitoring any failed notification message deliveries.

Figure 9:
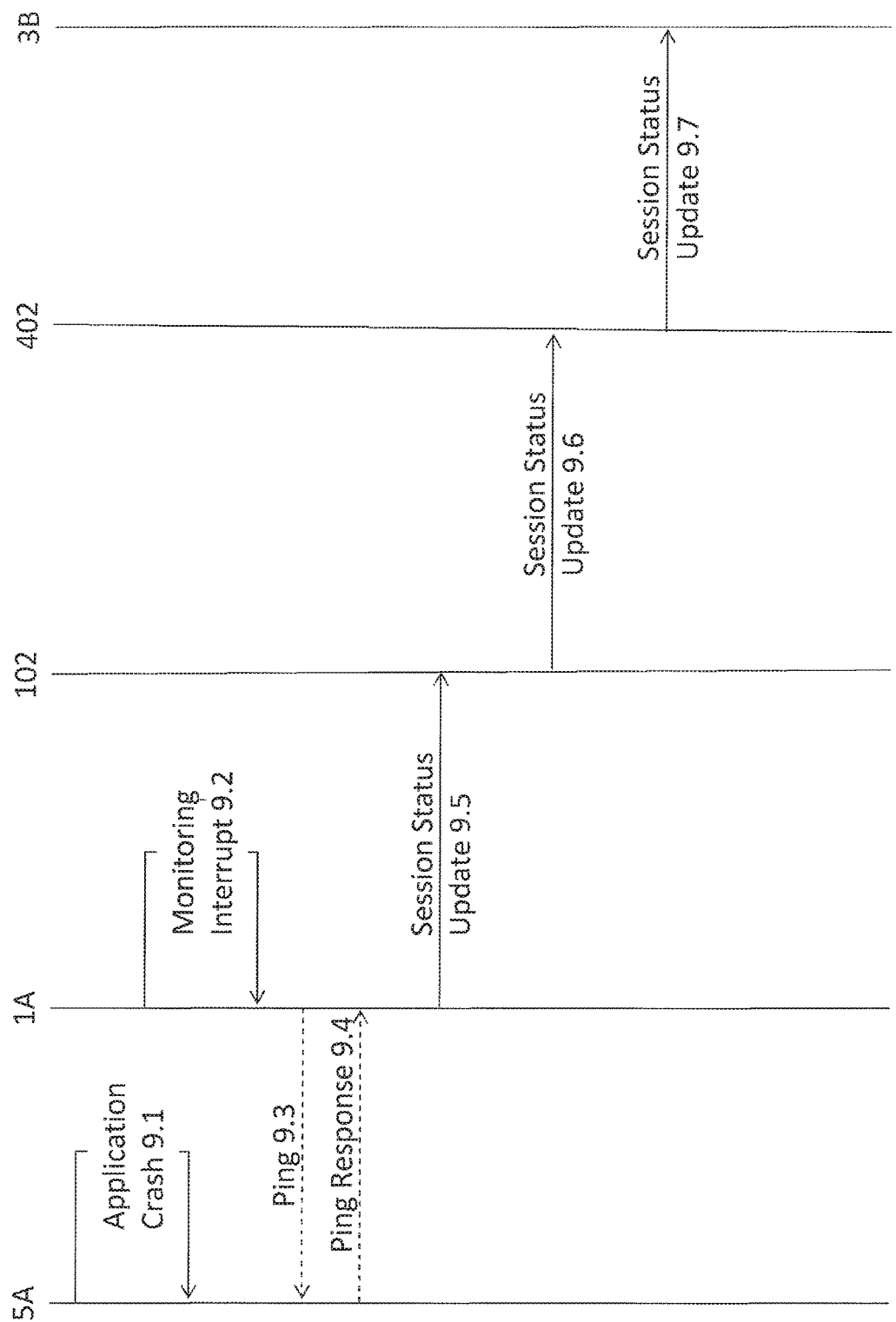
FIG. 9 is a timing diagram showing steps performed to maintain an application side context of the push notification session according to an embodiment.

In one arrangement and as shown in FIG. 9, the client terminal 1A performs a status monitoring process to monitor the status of the application 5A. The application status may be monitored periodically, such as in response to a monitoring interrupt event (step 9.2), or in response to reception of a message, such as a notification message, associated with the application 5A.

The client terminal 1A may determine the status of the application 5A by transmitting a ping message to the application 5A (step 9.3), an awaiting a response within a predetermined time period. As above, ping message may comprise any suitable mechanisms, such as the Internet Control Message Protocol (ICMP) ping utility, for determining the status of applications 5A, 5B and 5C.

If the response is received with the predetermined time period, the application 5A is determined to be operable. The client terminal 1A then generates an application status update message, and transmits it to the push provisioning manager 301, which may then transmit it to the server 3B (steps 9.5, 9.6 and 9.7).

For example, if a ping response is not received within the predetermined time period, the application 5A is determined to be inoperable. The client terminal 1A may then selectively transmit a tear down message so as to terminate the push notification session associated with the application 5A. The tear down message from the client terminal 1A causes the push provisioning manager 301 to mark the validity of the associated token as invalid, thereby terminating the push notification session. The push provisioning manager 301 may also transmit a session tear down message to the associated server 3B, or servers 3A and 3B, if the application 5A had established a plurality of push notification sessions with a plurality of servers 3A and 3B. Thus, the push provisioning entity 102 can control the push notification sessions on the basis of the operational status of application and server, and/or the session status.

Enterprise Network Session Control

Figure 10:
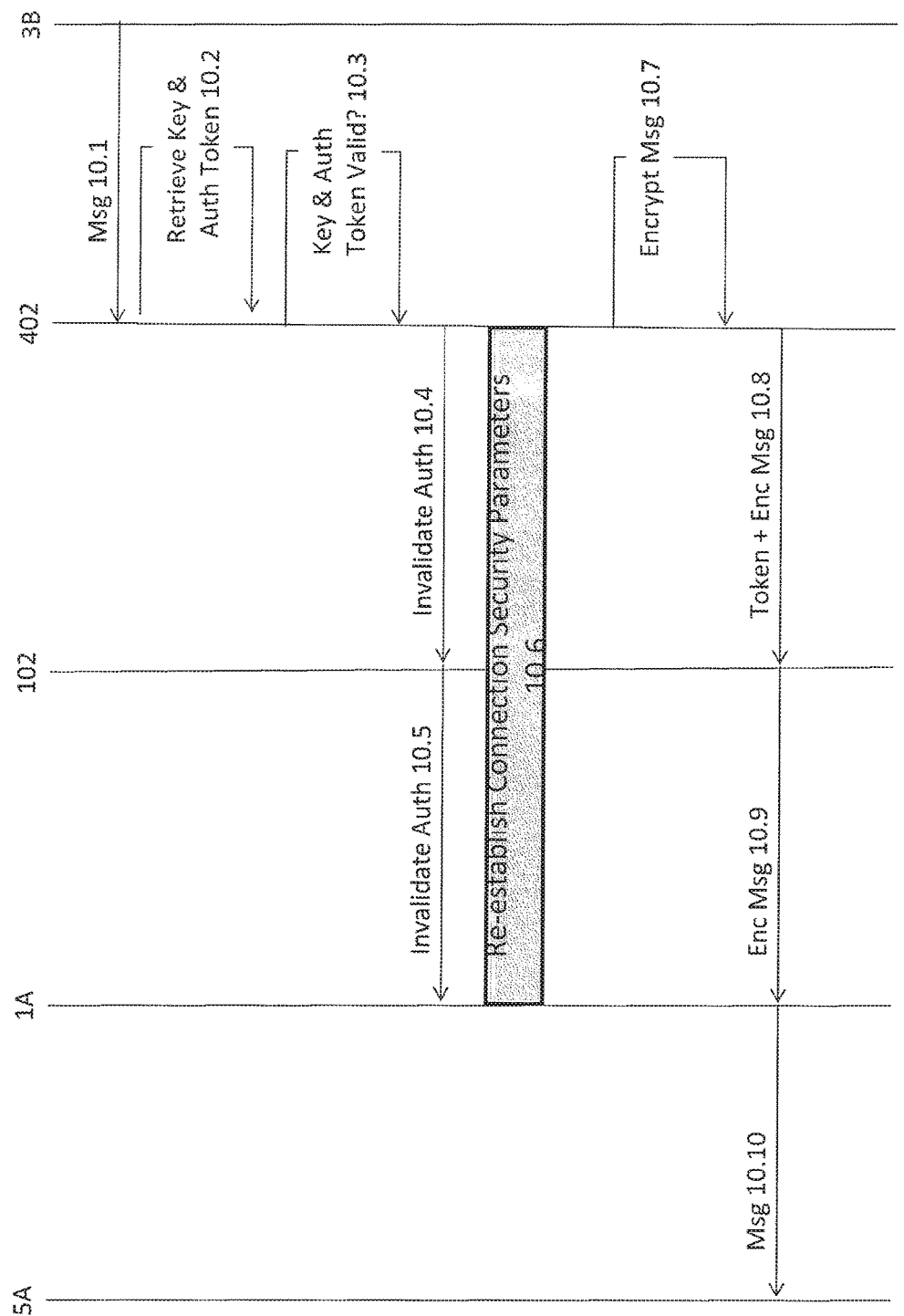
FIG. 10 is a timing diagram showing steps performed when controlling validity of the push notification session from the server end according to an embodiment.

Embodiments additionally permit the enterprise network 4B to control the validity of the push notification sessions associated therewith. The sequence of steps enabling the enterprise network 4B to control the validity of the push notification session in dependence on the device authentication will now be described with reference to FIG. 10.

As discussed above with reference to FIG. 6 specifically steps 6.5 to 6.12, the proxy server 402 and the client terminal 1A negotiate security parameters comprising an authentication token and a set of message encryption and decryption keys during the connection establishment phase (FIG. 5 step 5.10). The authentication token serves as an authentication parameter for the client terminal 1A.

In response to receiving a notification message from the server 3B, the proxy server 402 retrieves the authentication token and the encryption keys corresponding to the client terminal 1A (steps 10.1 and 10.2). The proxy server then verifies the validity of the authentication token and the message encryption key (step 10.3). In the event that the message encryption key and the authentication token are valid, the proxy server 402 encrypts the notification message with the message encryption key and packages encrypted message with the push notification session token (step 10.7). The proxy server 402 then transmits the package to the push provisioning manager 301, which verifies the push notification session token and uses it to determine the associated application 5A (step 10.8). The routing manager 308 transmits the encrypted notification message to the client terminal 1A corresponding to the application 5A. The client terminal 1A then decrypts the notification message utilizing the message decryption key, and provides the decrypted message to the associated application 5A (steps 10.9 and 10.10).

In case the authentication token is determined to be invalid at step 10.3, i.e. the validity of the authentication token has expired, the proxy server 402 withholds transmission of the notification message, and instead transmits an invalidate authentication token command to the client terminal 1A via the push provisioning manager 301 (steps 10.4 and 10.5). The push provisioning manager 301 may also update the session state of the associated push notification session accordingly.

In response to receiving the invalidate authentication command, the client terminal 1A re-establishes the connection with the enterprise network (step 5.10), and renews the validity of the authentication token or acquires a new authentication token (step 10.6). The proxy server 402 then encrypts the withheld notification message with the message encryption key and effects delivery of the withheld notification message to the application 5A as described above (steps 10.7-10.10).

In case the validity of the message encryption key is determined to be expired at step 10.3, the proxy server 402 may transmit the invalidate authentication token command, and cause the client terminal 1A to re-establish or renew the security connection parameters as described above (steps 10.4-10.6). The proxy server may alternatively renew the message encryption key and encrypt the notification message with the renewed message encryption key, which causes the encrypted notification message to be delivered to the client terminal 1A (steps 10.7-10.9). The client terminal 1A however would be unable to decrypt the notification message with the expired message decryption key.

The client terminal 1A may then re-establish or renew the security connection parameters, i.e. the authentication token and/or the message encryption and decryption keys, by re-establishing the secured connection with the enterprise network 4B (step 10.6). Upon acquiring the new message decryption key, the client terminal 1A decrypts and transmits the pending notification message to the application 5A.

Thus, in accordance with this embodiment the enterprise network 4B can control push notification sessions associated therewith by controlling the validity of connection parameters of the associated client terminals 1A, 1B, 1C and 1D.

The above embodiments are to be understood as illustrative examples of the invention. Further embodiment of the invention are envisaged. For example, the embodiments can be implemented as one or more software or firmware applications, computer-implemented methods, program products stored on a computer useable medium, for execution on one or more processors (e.g., CPU, microcontroller) or other computing devices in a wireless station.

Computer usable media includes both computer storage media and communication media including any medium that facilitates transfer of a computer program from one place to another. A storage media may be any available media that can be accessed by a computer. By way of example, and not limitation, such computer usable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed be a computer. Also, any connection is properly termed a computer usable medium. For example, if the software is transmitted from a website, server or other remote source using a coaxial cable, fiber optic cable, twisted pair, digital subscriber line (DSL), or wireless technologies such as infrared, radio, and microwave, then the coaxial cable, fiber optical cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer usable medium may comprise non-transitory computer usable medium (e.g., tangible media). In addition, in some aspects computer usable medium may comprise transitory computer usable medium (e.g., a signal). Combinations of the above should also be included within the scope of computer usable media.

It will also be appreciated that the various components and means of the network entity may reside on a cluster of individual entities such that the cluster of individual entities appears as a single entity to an external entity.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling a push notification session, comprising:
provisioning, by a first server, a push notification session between an application on a mobile device and a second server, the second server providing a service to the application, the provisioning comprising communicating a token related to the push notification session to the mobile device;
monitoring, by the first server, an operational status of the second server;
determining, by the first server, that the second server is inoperable;
invalidating, by the first server, the token related to the push notification session; and
sending, from the first server to the application on the mobile device, a session teardown message, thereby ending the push notification session.

2. The method of claim 1, wherein monitoring the operational status of the second server further comprises:
enabling, by the first server, a monitoring interval; and
sending, from the first server to the second server, a status enquiry message within the monitoring interval, the status enquiry message relating to the second server.

3. The method of claim 2, wherein determining that the second server is inoperable is based on not receiving a status update message from the second server in response to the status enquiry message sent to the second server.

4. The method of claim 1, wherein determining that the second server is inoperable is based on the first server not being able to communicate with the second server.

5. The method of claim 1, wherein determining that the second server is inoperable is based on receiving a status update message from the second server indicating that the second server is inoperable.

6. The method of claim 1, wherein determining that the second server is inoperable is based on a predetermined inactivity period associated with the second server.

7. The method of claim 1, wherein monitoring the operational status of the second server further comprises:
sending, from the first server to a proxy server, a status enquiry message, the status enquiry message intended for the second server, the proxy server being configured to establish the operational status of the second server on behalf of the first server; and receiving, at the first server from the proxy server, a status update message regarding the second server.

8. A method of controlling a push notification session, comprising:

provisioning, by a first server, a push notification session between a second server and an application on a mobile device, the second server providing a service to the application, the provisioning comprising communicating a token related to the push notification session to the mobile device;

monitoring, by the first server, an operational status of an application on the mobile device;

determining, by the first server, that the application on the mobile device is inoperable; and invalidating, by the first server, a token related to the push notification session; and sending, from the first server to the application on the mobile device, a session teardown message, thereby ending the push notification session.

9. The method of claim 8, wherein monitoring the operational status of the application on the mobile device further comprises:

enabling, by the first server, a monitoring interval; and sending, from the first server to the application on the mobile device, a status enquiry message within the monitoring interval, the status enquiry message relating to the application on the mobile device.

10. The method of claim 9, wherein determining that the application on the mobile device is inoperable is based on not receiving, at the first server, a status update message from the application on the mobile device in response to the status enquiry message sent to the application on the mobile device within a predetermined period of time.

11. The method of claim 8, wherein determining that the application on the mobile device is inoperable is based on a predetermined inactivity period associated with the application on the mobile device.

12. The method of claim 8, wherein determining that the application on the mobile device is inoperable is based on the first server not being able to communicate with the application on the mobile device.

13. The method of claim 8, wherein determining that the application on the mobile device is inoperable is based on receiving, at the first server, a status update message from the mobile device indicating that the application on the mobile device is inoperable.

14. A non-transitory computer-readable storage medium comprising computer-executable instructions which, when executed by a processor, cause a computing device to perform a method of controlling a push notification session, the method comprising:

provisioning, by a first server, a push notification session between an application on a mobile device and a second server, the second server providing a service to the application, the provisioning comprising communicating a token related to the push notification session to the mobile device;

monitoring, by the first server, an operational status of the second server;

determining, by the first server, that the second server is inoperable;

invalidating, by the first server, the token related to the push notification session; and sending, from the first server to the application on the mobile device, a session teardown message, thereby ending the push notification session.

15. The non-transitory computer-readable storage medium of claim 14, wherein monitoring the operational status of the second server further comprises:

enabling, by the first server, a monitoring interval; and sending, from the first server to the second server, a status enquiry message within the monitoring interval, the status enquiry message relating to the second server.

16. The non-transitory computer-readable storage medium of claim 14, wherein determining that the second server is inoperable is based on the first server not being able to communicate with the second server.

* * * * *